(12) United States Patent
Amir et al.

(10) Patent No.: US 12,205,124 B2
(45) Date of Patent: *Jan. 21, 2025

(54) CONSUMER-PERMISSIONED DATA PROCESSING SYSTEM

(71) Applicant: MeasureOne, Inc., San Francisco, CA (US)

(72) Inventors: Elan Amir, San Francisco, CA (US); Sapan Tushar Shah, Ahmedabad (IN); Unni Krishnan Kamatchi Pillai, Gandhi Nagar (IN)

(73) Assignee: MeasureOne, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,971

(22) Filed: Dec. 5, 2023

(65) Prior Publication Data

US 2024/0112201 A1 Apr. 4, 2024

Related U.S. Application Data

(63) Continuation of application No. 17/185,379, filed on Feb. 25, 2021, now Pat. No. 11,887,129.

(60) Provisional application No. 62/982,639, filed on Feb. 27, 2020.

(51) Int. Cl.
*G06Q 30/018* (2023.01)
*G06F 16/27* (2019.01)
*H04L 9/40* (2022.01)
*H04L 67/56* (2022.01)

(52) U.S. Cl.
CPC ............ *G06Q 30/018* (2013.01); *G06F 16/27* (2019.01); *H04L 63/0281* (2013.01); *H04L 63/08* (2013.01); *H04L 63/102* (2013.01); *H04L 67/56* (2022.05)

(58) Field of Classification Search
None
See application file for complete search history.

(56) References Cited

U.S. PATENT DOCUMENTS

| | | | |
|---|---|---|---|
| 6,317,783 B1 | 11/2001 | Feishtat et al. | |
| 6,405,245 B1 | 6/2002 | Burson et al. | |
| 6,871,220 B1 | 3/2005 | Rajan et al. | |
| 7,606,752 B2 | 10/2009 | Hazlehurst et al. | |

(Continued)

*Primary Examiner* — Quang N Nguyen
(74) *Attorney, Agent, or Firm* — Almanac IP Advisors LLP

(57) ABSTRACT

A networked data processing system that provides an application programming interface (API) for consumer-permissioned data, such as academic data, employment data and income data. In some implementations, the data processing system enables application developers to integrate consumer-permissioned data (such as academic data) into their applications. In some implementations, the API enables a developer to focus on other aspects of a given application, while leveraging the data processing system to handle aspects of gathering and processing the source data, such as authenticating the provenance of the source data, handling user permissions, extracting the source data, reviewing the source data, verifying the source data, generating one or more scores from the source data, analyzing the source data relative to a defined purpose, providing the information sought from the analyzed data, and the like.

17 Claims, 3 Drawing Sheets

(56) References Cited

U.S. PATENT DOCUMENTS

| | | | |
|---|---|---|---|
| 8,024,784 B1 * | 9/2011 | Issa | H04L 63/0281 713/153 |
| 8,280,982 B2 * | 10/2012 | La Joie | H04N 21/8193 709/219 |
| 8,984,152 B1 * | 3/2015 | Van Elburg | H04L 67/147 370/310 |
| 9,213,967 B1 | 12/2015 | Ferguson | |
| 9,449,346 B1 | 9/2016 | Hockey et al. | |
| 9,591,531 B2 * | 3/2017 | Salkintzis | H04L 47/2475 |
| 9,973,511 B2 | 5/2018 | Ott | |
| 10,182,126 B2 | 1/2019 | Johnsimon | |
| 10,489,311 B1 | 11/2019 | Vajravel | |
| 10,924,528 B1 * | 2/2021 | Korobov | H04L 67/12 |
| 11,184,456 B1 | 11/2021 | Thai | |
| 11,528,327 B1 * | 12/2022 | Korepanov | H04L 67/141 |
| 2009/0191527 A1 | 7/2009 | King et al. | |
| 2009/0271854 A1 | 10/2009 | Hazlehurst et al. | |
| 2009/0282806 A1 | 11/2009 | DePue | |
| 2010/0215270 A1 | 8/2010 | Manohar et al. | |
| 2011/0022496 A1 | 1/2011 | Johnson et al. | |
| 2012/0191819 A1 * | 7/2012 | Calomeni | H04L 67/563 709/219 |
| 2013/0204778 A1 | 8/2013 | Connors et al. | |
| 2013/0246317 A1 | 9/2013 | Martin | |
| 2014/0236792 A1 | 8/2014 | Pant et al. | |
| 2014/0258063 A1 | 9/2014 | Chourasia et al. | |
| 2015/0012443 A1 | 1/2015 | Bhat et al. | |
| 2015/0066719 A1 | 3/2015 | Agrawal et al. | |
| 2015/0146984 A1 | 5/2015 | Brown | |
| 2015/0193699 A1 | 7/2015 | Kil et al. | |
| 2015/0310562 A1 | 10/2015 | Chourasia et al. | |
| 2016/0026689 A1 | 1/2016 | Strazzarino | |
| 2016/0371805 A1 | 12/2016 | Knotts et al. | |
| 2017/0068895 A1 | 3/2017 | Kil et al. | |
| 2017/0078259 A1 | 3/2017 | Kumar et al. | |
| 2017/0255993 A1 | 9/2017 | Pant et al. | |
| 2018/0013746 A1 | 1/2018 | Kumar et al. | |
| 2018/0285599 A1 | 10/2018 | Praveen et al. | |
| 2018/0300408 A1 | 10/2018 | Kavuri | |
| 2018/0300608 A1 | 10/2018 | Sevrens et al. | |
| 2018/0349436 A1 | 12/2018 | Agrawal et al. | |
| 2019/0014101 A1 | 1/2019 | Hockey et al. | |
| 2019/0108440 A1 | 4/2019 | Adib et al. | |
| 2019/0108593 A1 | 4/2019 | Yadav et al. | |
| 2019/0138941 A1 | 5/2019 | Kam et al. | |
| 2019/0182233 A1 | 6/2019 | Hockey et al. | |
| 2019/0236247 A1 | 8/2019 | Jain et al. | |

* cited by examiner

CONSUMER-PERMISSIONED DATA PROCESSING SYSTEM

CROSS-REFERENCE TO RELATED APPLICATION

The present application is a continuation application of U.S. application Ser. No. 17/185,379 filed Feb. 25, 2021, which claims priority to U.S. provisional application Ser. No. 62/982,639 filed Feb. 27, 2020, both of which are incorporated herein by reference for all purposes.

BACKGROUND

Field of the Disclosure

The disclosure relates generally to consumer-permissioned data and, in some implementations, consumer-permissioned data processing systems that can be leveraged in credit scoring, marketing, enrollment verification, education verification, income verification, employment verification, health-records verification and a variety of other applications.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The consumer credit industry heavily relies on models for predicting user behavior. Traditional credit scoring models typically focus on historical user activity related to credit, such as credit cards, mortgages and auto loans, as gathered by credit bureaus. These models, however, may prove inadequate for individuals with little to no credit history. The drive to effectively score more consumers has involved the consideration of non-traditional—or alternative—consumer data, that is available for a larger portion of the population, including those who tend to avoid credit products. Alternative credit data looks beyond conventional credit bureau data that typically focuses on credit accounts. Common types of alternative credit data include rent and utility payment history, bank account balances and history, and asset ownership.

SUMMARY OF THE DISCLOSURE

The present disclosure describes methods, apparatuses and systems directed to leveraging consumer-permissioned data in credit scoring, marketing, verification and other applications. Embodiments of the present disclosure provide a networked data processing system that provides an application programming interface (API) for consumer-permissioned data, such as academic data, employment data and income data. In some implementations, the data processing system enables application developers to integrate consumer-permissioned data (such as academic data) into their applications. In some implementations, the API enables a developer to focus on other aspects of a given application, while leveraging the data processing system to handle aspects of gathering and processing the source data, such as authenticating the provenance of the source data, handling user permissions, extracting the source data, reviewing the source data, verifying the source data, generating one or more scores from the source data, analyzing the source data relative to a defined purpose, providing the information sought from the analyzed data, and the like.

For example, in instances relating to academic data, implementations of the data processing system can be leveraged to deal with the complexity of grading systems, credit units, term definitions, course names, and other attributes that makes up this complex data set. A Student Information System (SIS) is a management information system for education establishments to manage academic data, such as student enrollment and transcript information. Academic data is remarkably complex. Today, the vast majority of academic data is provided in document format: PDFs, HTMLs, and images. In addition to this complexity, there are no standards for the data. Each academic institution has its own definition for credits, grades, terms, and many other attributes. Together, this makes using this data burdensome and almost impossible for all but the simplest tasks. As discussed herein, implementations of the consumer-permissioned data processing system can be leveraged to access the desired academic data in a consumer-permissioned manner and, in a particular use case, to normalize the academic data to a standard format to allow for better comparisons across academic institutions. In another example, implementations of the data processing system can be leveraged to deal with the complexity and fragmentation of payroll systems used by employers. The payroll systems used by employers provides the history of employment and income data for present and past employees including but not limited to the information about their income, break-up of categories of employment history, deductions, etc. Payroll processors don't have a standard format or mechanism for the data.

The consumer-permissioned data processing system described herein can be configured to handle a variety of different types of source data associated with a given individual, such as employment data, income data and academic data. An application developer, such as a lending institution, may develop an application on web or mobile devices that leverages the APIs of the data processing system to obtain consumer-permissioned data from a data source, such as an academic institution, a financial institution, a payroll processing system, a government account system, and the like. In an example workflow, the web-based application may leverage the data processing system to obtain source data associated with an individual for a defined purpose. In certain implementations, the source data is hosted by a remote computing system and is associated with a user account that requires user credentials (e.g., user name, password, etc.) to obtain. The data processing system may be leveraged to connect with a client device associated with the individual to proxy a connection between that client device and the remote host that has access to the source data. The data processing system may extract the source data during the proxied connection and process the data for a defined purpose, such as enrollment verification, degree verification, income verification, and the like. Data processing system may provide access to the processed data to the application developer via one or more APIs.

Data processing system also acts as a consumer-permissioned information proxy between individuals and application developers. For example, in many instances, the scope of the consumer-permissioned data returned to the application developer is limited by the defined purpose and may be different from (or less than all of) the underlying source data. For example, if the defined purpose is an enrollment status determination, the data processing system may access a wide array of the source data available at a given academic institution to determine enrollment status, only the enrollment status determination itself may be returned to the application developer.

DETAILED DESCRIPTION

Figure 1:
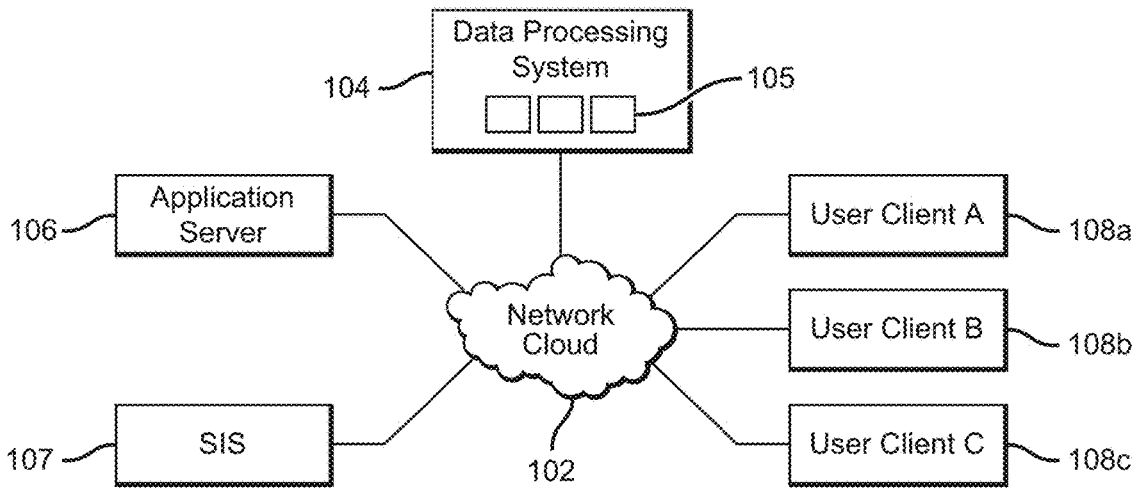
FIG. 1 illustrates a network computer system environment for implementing embodiments of the disclosure.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. For example, the following describes application of the invention to academic data, income data and employment data. Implementations of the invention, however, can extend to other consumer-permissioned data stored at a remote host in association with an individual user or account. Thus, this disclosure is not intended to be limited to the embodiments shown but is to be accorded the widest scope consistent with the principles and features disclosed herein.

The API, in some implementations, provides building blocks for developers to leverage source data, such as academic transcript data. For example, the API and associated functionality facilitate a variety of operations on academic data including enrollment verification, graduation or degree verification, transcript access, extraction of data from transcripts, normalization of data across academic institutions and predictive analytics based on academic data. In some implementations, the data processing system further includes proxy-based functionality that facilitates the retrieval of academic transcript data directly from academic institutions. In addition to transcripts, the API supports academic data provided directly by users, through a form-submission experience. This is particularly useful in instances where an application developer may desire to perform pre-screening based on user-reported information, with the intention of validating actual transcript data later in the process.

In some implementations, loan or credit application developers can leverage the data processing system to assist students and recently graduated students in their first steps into consumer "adulthood" by unlocking the value of their own academic data. These "emerging consumers" are starting their way in the workforce but of course have little to no work, credit or other meaningful commercial history. The result is that these individuals are regularly undervalued when looking to receive services and products from financial, insurance, employment, or educational institutions. The common thread in the consistent undervaluing of this population is the lack of data or lack of activity that would provide insights into our data-driven age. And yet, these emerging consumers 30 million in the US alone—have in fact achieved quite a bit. 70% have a college degree. 21% have advanced degrees, and almost all have generated some form of academic data. This data may be leveraged to benefit these consumers as they engage in activities such as get their first apartment, apply for a job, refinance their student loan, or apply for auto insurance.

A current problem is that academic data is inaccessible, inconsistent, and practically unusable by businesses or other enterprises outside of the particular academic institutions that maintain the data. The lack of common formats and standards, as well as the inherent variability between educational institutions, combined with the legitimate mismatch between the requirements of internal and external application developers, have raised huge barriers to innovation. The result is that young people are not able to benefit from their academic achievements at a time when they could most use that help.

As described below, the APIs allow developers to incorporate academic data (or other consumer-permissioned source data) natively into their applications in the same way that other data is integrated. In some implementations, a benefit of the academic data processing system is that data normalization allows for comparison of data across academic institutions. Normalizing academic data in this manner allows for the development of robust predictive models. These predictive models may, for example, address a given individual's credit performance or academic persistence rate, allowing institutions to better tailor the service they offer. For example, a so-called "MeritScore" may correlate academic transcript data to credit performance. A so-called "GradScore" may correlate transcript data to persistence rate (the likelihood that a given student will be enrolled 12 months from the time of measurement).

As discussed below, however, the functionality of consumer-permissioned data processing system may be augmented to access other types of source data, including income and employment data.

FIG. 1 illustrates a distributed system in which embodiments of the disclosure may operate. In embodiments, the distributed system may include data processing system 104, one or more application servers 106, one or more student information systems 107, and one or more user clients 108a-c. The foregoing components of the system communicate over network cloud 102. Network cloud 102 comprises one or more telecommunications networks over which the various components of the system communicate. Network cloud 102 can include, without limitation, one or more of any of the following network types: local area networks, wide area networks, wireless cellular networks, cable networks, the internet, and the like.

Data processing system 104, in some implementations, provides the operational and management hub for the system, maintaining (among other things) developer accounts and transcript and other consumer-permissioned data, as well as the consumer-permissioned data processing functionality described herein. Data processing system 104 comprises one or more servers 105 that communicates with application server 106, student information system 107 and user clients 108*a-c* over network 102. The server(s) 105 are coupled locally or remotely to one or more databases, which may include one or more corpora of libraries including data such as image data, web site content, developer account data, user account data, transcript data, and the like. Student information system 107, an example data source, is associated with an educational institution (e.g., college, university, etc.) and maintains enrollment and transcript data for a plurality of current and former students. In some implementations, the student information system 107 maintains user accounts for each student and, after authentication, allows access to enrollment and transcript data. In embodiments, the server(s) 105, application server 106, student information system 107 and user clients 108*a-c* each include at least one processor and at least one memory storing instructions that, when executed by the processor(s), perform the communications and other workflows described below according to embodiments of the disclosure. Other data sources may include payroll processing systems, utility providers, government information systems, and the like.

Data processing system 104 supports a set of APIs and associated functionality allowing application developers to develop distributed applications that leverage consumer-permissioned data, such as academic and/or employment data. In one implementation, the APIs support workflows directed to the extraction of consumer-permissioned academic data from one or more student information systems 107. In some implementations, data processing system 104 acts as an information proxy supporting the conversion of the academic data into a processable form, the normalization or standardization of the academic data, the processing of academic data in relation to a defined purpose (such as an enrollment status or degree completion check), and/or the application of the academic data against one or more scoring models. The scoring models can use academic data associated with a particular user as an input to predict certain behaviors, such as credit activity or graduation success. In one implementation, the data processing system 104 supports Representational State Transfer (REST) APIs. In some implementations, data extraction involves a proxied communication session between a client device associated with a subject individual and a remote host (such as a student information system 107) that contains source data relating to the subject individual.

Data processing system 104 offers a secure, API-based platform to power consumer-permissioned data sharing, providing a safe and transparent way for consumers to share data with third-party applications. In one implementation, data processing system 104 acts as a bridge between data sources containing the consumer's personal data and data recipients, such as financial institutions. Data sources are online systems that host the source data to be shared and that are accessible to the consumer. Example data sources are academic institutions, payroll processors, utility providers, government systems and others. Data recipients are any third-party entity that the consumer wishes to share information with, often in return for a product or service that the data recipient is offering. Example recipients are lenders, marketers, background check companies, employers, recruiters, and others.

The APIs discussed herein allow application developers as a data recipient to integrate consumer-permissioned data into their workflows. Data processing system 104 does so by facilitating consent, access, acquisition, and delivery of your users' permissioned data. The basic workflow of consumer-permissioned sharing is as follows. First, a user provides consent to data processing system 104 to share specific personal information with a recipient entity. The user shares credentials with data processing system 104 providing access to data—called "source data"—that provides the information that they have consented to share with the data recipient. Data processing system 104 uses these credentials to connect that data source to its platform, access and acquire the source data. Data processing system 104 then processes the data and provides access to this source data through a set of service APIs.

There are several benefits to using the API. The API hides the complexity involved in the consumer-permissioned workflow behind a straightforward API so that application developers can focus on their applications and customer experience. The data processing system 104 handles user credentials obviating the need for the application developer to do so. Data processing system 104 handles consents from the user and ensure that the application developer only receives access to the consented information, freeing the developer from the need to worry about accessing consumer information improperly. Data processing system 104 also ensures the provenance of the shared data. The data is shared by the user, with their explicit consent, but without any ability to modify or tamper with it.

Application developers can leverage data processing system 104 to achieve a variety of use cases, such as student discounting, tenant screening, employment screening, insurance underwriting, education screening, and financial products (such as credit determinations). For example, data processing system 104 may be used to assess a candidate's academic qualification, academic history and/or student enrollment status. Data processing system 104 supports acquisition and processing of academic documents. By connecting the user's academic institution, data processing system 104 can use the shared transcripts and other educational data to provide an assessment or verification of educational data. This includes academic history, degree verification, student enrollment status or other similar data. Data processing system 104 can also be used for income or employment verification. For example, application developers may use data processing system 104 to extracting income information from paystubs, 1099s or other income-related documents to provides a comprehensive solution to assessing a given user's income. Data processing system 104 can also be used in connection with identity and fraud detection. By leveraging multiple items of consumer-permissioned data, data processing system 104 provides unique opportunities to customers to establish identity and protect against fraud. Data processing system 104 also offers predictive analytics for financial underwriting based on alternative data. As discussed below, data processing system 104 provides a MeritScore based on a proprietary predictive analytic that correlates credit performance to academic data. Using consumer-permissioned transcripts, data processing system 104 can provide a score that correlates the user's academic performance to credit default risk. This both reduces risk for a lender while opening up new credit opportunities for young borrowers.

In one implementation, data processing system 104 controls access to its functionality by maintaining developer accounts and using authentication and cryptographic protocols. For example, data processing system 104 may control access to the functionality corresponding to its API by requiring the inclusion of a cryptographic key (e.g., a secret key) in API requests. Data processing system 104 may use OAuth 2.0 or any other suitable authentication protocol to authenticate the requests. In one implementation, the API uses POST requests to communicate and HTTP response codes to indicate status and errors. In one implementation, unless explicitly specified, all responses come in standard JSON and all requests must include a Content-Type of application/json with a valid JSON body. The following illustrates an example request:

```
curl "https://api.measureone.com/v1/transcripts/new"
-H "Authorization: bearer <YOUR_API_KEY>"
-H "Content-Type: application/json"
-H "version: 202011001"
-d "@sample_input.json"
-X POST
```

Endpoints are used to facilitate integration of individual users, data sources, Items, Services, transcript files, transcript data and transcript analytics into an application workflow. Table 1 shows an example set of endpoints that data processing system 104 may support.

TABLE 1

Endpoints

| Resource | Endpoint | Description |
| --- | --- | --- |
| Authentication | /auth/generate_access token | Generates an access token |
| | /auth/invalidate | Invalidates an access token |
| | /auth/generate_public_token | Generates a public token |
| Invitations | /invitations/new | Creates a new invitation |
| | /invitations/get | Get the list of invitations based on the filter criteria provided |
| | /invitations/get_by_id | Get the details of an Invitation |
| | /invitations/expire | Expire an Invitation |
| Individuals | /individuals/new | Create a new individual |
| | /individuals/get_by_id | Get details of an Individual |
| | /individuals/academic_accounts/new | Register a new academic account |
| | /individuals/get_academic_summary | Get Academic summary for an individual |
| | /individuals/get_enrollment_status | Get enrollment status for an individual |
| Schools | /schools/get | Get/Search the list of schools and related information |
| Items | /items/new | Create a new item |
| | /items/upload | Upload item document |
| | /items/get_by_id | Upload item document |
| | /items/get_files | Download the items uploaded via '/items/upload' API |
| Transcripts | /transcripts/new | Create a transcript |
| | /transcripts/upload | Upload data for a new transcript |
| | /transcripts/get_by_id | Get data for a transcript |
| | /transcripts/get_digest_by_id | Get data in digest form for a transcript |
| | /transcripts/get_files | Download transcript files |
| Analysis | /analytics/meritscore | Get the MeritScore for a transcript |
| | /analytics/gradscore | Get the Gradscore for a transcript |

Certain features of the data processing system 104 are directed to extracting and standardizing data from data sources (such as transcript files) to provide a digital record for easy integration into applications. Data processing system 104 may support a wide range of file formats, HTML, PDF, rich text documents, MS Word, images, etc. Data processing system 104 may support optical character recognition to extract text from image files. Data processing system 104 may also include parsing functionality to extract data from the transcript data to render the data analyzable and searchable for further processing. Data processing system 104 may also include functions and services to process the data for a defined purpose, such as an enrollment status. In some implementations, while data processing system 104 may access an entire transcript or other source data, it only returns to the requesting entity such information necessary for the defined (and consumer-permissioned) purpose, such as enrollment status.

Data processing system 104 facilitates the integration of this processing into a variety of different applications and workflows. In one implementation, after submitting the transcript document, the data processing system 104 generates a unique ID for the document and returns it to the requesting system. In some implementations, once transcript processing has been completed, a webhook or other notification may be initiated. On receiving this notification, an application may retrieve the processed transcript utilizing the API call/transcripts/get by id with the corresponding transcript ID to get the raw and/or standardized values for the transcript. In one implementation, standardized or normalized values are generated by applying a normalization file that maps attributes (or combinations of attributes) of the raw data received from a given academic institution to a standard, normalized form.

The following sets forth example data objects and endpoints supported by one possible implementation of data processing system 104. In other implementations, data processing system 104 may support fewer or more data objects and endpoints.

Individuals

The Individual is a core resource that represents an individual user or consumer. In some implementations, an Individual object is created at the start of a workflow. Retrieved Items are associated with an Individual object. Almost all Service APIs take the Individual ID as a reference. To create a new Individual object, an HTTP POST (individuals/new, above) can be transmitted to data processing system 104, which returns an identifier (individual id) associated with the created Individual object. The returned identifier may then be used in subsequent API calls to reference Items and Services.

The following illustrates example parameters and schemas for a request to create a new Individual object.

| HEADER PARAMETERS | |
|---|---|
| version | number<br>Version number of the System API you wish to integrate. |
| Authorization | string <bearer <API_KEY>><br>Authorization API Key |
| Content-type | string <application/json><br>Content-type of the request payload. System accepts content in application/json format unless specified otherwise |

| REQUEST BODY SCHEMA: application/json | |
|---|---|
| external_id | string <= 45 characters<br>A customer generated unique identifier linked to the individual |
| first_name required | string <= 45 characters<br>First name of the individual |
| middle name | string <= 45 characters<br>Middle name of the individual |
| last_name required | string <= 45 characters<br>Last Name of the individual |
| attending_name | string<br>Attending name of the individual |
| email required | string<br>Email address of the individual |
| prefix | string <= 5 characters<br>Name prefix |
| suffix | string <= 5 characters<br>Name suffix |
| gender | string <= 1 characters<br>Gender of the individual |
| date of birth | string <MM/DD/YYYY>/(0[1-9]|1[012])[-\/.](0[1-9]|[12][0-9]|3[01 . . . Show pattern<br>Date of Birth of the individual in MM/DD/YYYY format. |
| phone_number | string <= 15 characters<br>Phone number of the individual |
| address | object |

Data Sources

Data Sources are network-addressable locations of Items. Individual users or consumers connect Data Sources and provide data processing system 104 with their credentials and consent so that data processing system 104 may retrieve Items (their data) from the Data Source to be subsequently shared with the requesting entity in a strictly permissioned way. Data Sources may be universities or other academic institutions, financial institutions, payroll systems, government records, and employer systems. Data processing system 104, in one implementation, curates the list of Data Sources to ensure the provenance of the retrieved documents. Since not all Data Sources may be relevant to a given application, the API allows developers to configure and select the list of Data Sources that are displayed to an individual user.

The following shows example endpoints and associated request and response schemas related to Data Sources.

The datasources/init endpoint may be called to initiate a Data Source.

| HEADER PARAMETERS | |
|---|---|
| version | number<br>Version number of the System API you wish to integrate. |
| Authorization | string <bearer <API_KEY>><br>Authorization API Key |
| Content-type | string <application/json><br>Content-type of the request payload. System accepts content in application/json format unless specified otherwise |

| REQUEST BODY SCHEMA: application/json | |
|---|---|
| name | string<br>Name of the connection. If null, it will be the same as the data source name |
| datasource_id required | string<br>Unique identifier of the data source identified by System. |
| external_id | any<br>A customer generated unique identifier linked to the string data source |
| individual_id required | string data source<br>System provided unique identifier of individual |

Responses
 Successful Response 200

| RESPONSE SCHEMA: application/json | |
|---|---|
| id | string<br>Unique ID of the connection |
| session_id | string<br>System provided unique identifier of the session for the connection |

202: The request is Accepted and MFA is required to complete the authentication

| RESPONSE SCHEMA: application/json | |
|---|---|
| id | string<br>Unique ID of the connection |
| session_id | string<br>System provided unique identifier of the session for the connection string |
| mfa_type | string<br>Value: "DUO"<br>Type of MFA. Currently, System supports only DUOtype MFA. |
| mfa_method | string<br>Enum: "PASSCODE" "PHONE_CALL" "DUO_PUSH"<br>Method of authentication for MFA. Duo currently provides three methods to authenticate MFA request. |

Connect to a Data Source (Datasources/Connect).

This endpoint initiates the connection to a Data Source, starting the workflow to access and acquire the consumer-permissioned Items.

| HEADER PARAMETERS | |
|---|---|
| version | number<br>Version number of the System API you wish to integrate. |
| Authorization | string <bearer <API_KEY>><br>Authorization API Key |
| Content-type | string <application/json><br>Content-type of the request payload. System accepts content in application/json format unless specified otherwise |

| REQUEST BODY SCHEMA: application/json | |
|---|---|
| connection_d<br>required | string<br>Unique ID of the academic account identified by System |
| session_id<br>required | string<br>Unique ID of the session identified by System |
| credentials | object<br>Credentials to access the datasource |

Responses

200: Successful Response

| RESPONSE SCHEMA: application/json | |
|---|---|
| id | string<br>Unique ID of the connection |
| session_id | string<br>System provided unique identifier of the session for the connection |

202: The request is Accepted and MFA is required to complete the authentication

| RESPONSE SCHEMA: application/json | |
|---|---|
| id | string<br>Unique ID of the connection |
| session_id | string<br>System provided unique identifier of the session for the connection |
| mfa_type | string<br>Value: "DUO"<br>Type of MFA. Currently, System supports only DUOtype MFA. |
| mfa_method | string<br>Enum: "PASSCODE" "PHONE_CALL" "DUO_PUSH"<br>Method of authentication for MFA. Duo currently provides three methods to authenticate MFA request. |

Get/Search Data Sources (Datasources/Get)

A call to a datasources/get endpoint retrieves a list of Data Sources supported by data processing system 104. The endpoint provides filtering that enables applications to limit the Data Source list to only those that are relevant to the user or application. For example, an educational verification application could limit the Data Sources to academic institutions.

| HEADER PARAMETERS | |
|---|---|
| version | number<br>Version number of the System API you wish to integrate. |
| Authorization | string <bearer <API_KEY>><br>Authorization API Key |
| Content-type | any <application/json><br>Content-type of the request payload. System accepts content in application/json format unless specified otherwise |

| REQUEST BODY SCHEMA: application/json | |
|---|---|
| filters | object<br>Allows filtering the list by different attributes |

Responses

200

Successful Response

| RESPONSE SCHEMA: application/json | |
|---|---|
| id | string<br>Unique ID of the data source identified by System |
| type | string<br>Enum: "EDUCATION" "EMPLOYMENT""INCOME"<br>The type of data source |
| status | string<br>Enum: "ACTIVE" "INACTIVE" "TEMPORARY_INACTIVE"<br>Status of the datasource |
| display_name | string<br>Display name of the data source |
| description | string<br>Description of the data source. |
| profile | object<br>Additional properties of the data source. This may vary depending on the type of the data source. |
| access_methods | Array of objects<br>Fields required to access the data source. |

Items and Services

Items are resources representing data shared by Individuals with data processing system 104. The underlying document of an Item is called source data. These can be college transcripts, pay stubs, real estate titles, etc. Items are stored and information from them can be retrieved by application developers through Service API calls. The information in an Item is shared through the Service APIs according to the consumer permission. In some implementations, unless permissioned by the Individual, the Item data may not be shared directly with a requesting entity.

Submit a New Item (Items/New)

In some implementations, the usage of the items/new endpoint varies depending on its intended use and availability of information. The request payload may include either a source_data_value object or a source_data_reference object. Passing both as a part of the payload may result in processing errors. If the attribute values for a transcript are known, an API call may send the source data inline in the request using the source_data_value object. If the data is in a document, an API call may be made to upload it using the/items/upload endpoint or make it available at a remote location. A reference to the uploaded document may then be included in the request using the source_data_reference object.

| HEADER PARAMETERS | |
|---|---|
| version | number<br>Version number of the System API you wish to integrate. |
| Authorization | string <bearer <API_KEY>><br>Authorization API Key |
| Content-type | string <application/json> |

| REQUEST BODY SCHEMA: application/json | |
|---|---|
| individual_id | string |
| | System generated unique identifier linked to the item. If this is not provided, System will generate a new individual_id for given item. |
| datasource_id | string |
| | Unique identifier of the datasource. |
| source_data_type | string |
| | Enum: "M1_ACADEMIC_RECORD" "M1_DIGEST" "M1_EMPLOYMENT_RECORD""M1_INCOME_RECORD" "TRANSCRIPT_ FILE""RENT_RECEIPT_FILE" "PAYSTUB_FILE""W9_FILE" "UTILITY_BILL_FILE" |
| | The type of the source data |
| source_data required | Array of Source Data Value (object) or Source Data Reference (object) (Source Data Object) |
| | Source data object contains one complete academic record. Multiple source data objects containing source_data_value will result in an error |

Responses
200: Successful Response. An application may now call the endpoints to get desired information from a transcript.

| RESPONSE SCHEMA: application/json | |
|---|---|
| id | string |
| | ID of the created record |
| individual_id | string |
| | Unique ID of the individual identified by System |
| processing_status | string |
| | Enum: "IN_PROGRESS" "COMPLETED" |

Upload Files

The/items/upload endpoint may be used to upload documents containing source data for a new item. In one implementation, supported file types include: Doc, HTML, JPG, JSON, PDF, PNG, TIFF, TIF, and TXT.

| HEADER PARAMETERS | |
|---|---|
| version | number |
| | Version number of the System API you wish to integrate. |
| Authorization | string <bearer <API_KEY>> |
| | Authorization API Key |
| Content-type | string <application/json> |
| | Content-type of the request payload. System accepts content in application/json format unless specified otherwise |

| REQUEST BODY SCHEMA: APPLICATION/FORM-DATA-UPLOAD |
|---|
| files |
| Array of strings |
| Responses |

200: Successful Response

| RESPONSE SCHEMA: APPLICATION/JSON | |
|---|---|
| uri | string |
| | URI scheme for a remote document. The supported schemes include the M1 scheme, an internal scheme used to refer to internal System resources. See below for examples. |
| | Supported Schemes |
| | are M1, HTTP, HTTPS, FTP, SFTP.Format scheme:[//authority ]path[?query ][#fragment] |

| RESPONSE SCHEMA: APPLICATION/JSON | |
|---|---|
| processing_status | string |
| | Enum: "IN_PROGRESS" "COMPLETED" |
| | Processing status |

Get Item Details

The items/get_by_id endpoint may be called to retrieve the details of an existing Item. The endpoint can be used once the processing_status for an Item is COMPLETED. It will return Item data in its response payload. If the processing of the Item is not yet complete, it will return the current status of the Item.

| HEADER PARAMETERS | |
|---|---|
| version | number |
| | Version number of the System API you wish to integrate. |
| Authorization | string <bearer <API_KEY>> |
| | Authorization API Key |
| Content-type | string <application/json> |
| | Content-type of the request payload. System accepts content in application/json format unless specified otherwise |

| REQUEST BODY SCHEMA: APPLICATION/JSON | |
|---|---|
| id required | string |

Responses
200: Successful Response

| RESPONSE SCHEMA: APPLICATION/JSON | |
|---|---|
| id | string |
| | Unique ID of the item identified by System |
| created_at | integer |
| | Timestamp for when the item was created |
| updated_at | integer |
| | Timestamp for when the item was last updated |
| individual_id | string |
| | System generated unique identifier linked to the item. If this is not provided, System will generate a new individual_id for given item. |
| datasource_id | string |
| | Unique identifier of the datasource. |
| source_data_type | string |
| | Enum: "M1_ACADEMIC_RECORD" "M1_DIGEST" "M1_EMPLOYMENT_RECORD" "M1_INCOME_RECORD" "TRANSCRIPT_FILE" "RENT_RECEIPT_FILE" "PAYSTUB_FILE" "W9_FILE" "UTILITY_BILL_FILE" |
| | The type of the source_data |
| source_data required | Array of Source Data Value (object) or Source Data Reference (object) (Source Data Object) |
| | Source data object contains one complete academic record. Multiple source data objects containing source_data_value will result in an error |
| processing_status | string |
| | Enum: "IN_PROGRESS" "COMPLETED" |
| | Processing status of the item |
| data | M1_TRANSCRIPT Schema (object) or M1_EMPLOYMENT_RECORD Schema (object) or M1_INCOME_RECORD Schema (object) or M1_DIGEST Schema (object) |

As discussed above, data processing system 104 may also provide endpoints associated with one or more Services, such as returning enrollment status, an academic summary, income summary, employment status, and the like. The following provides example endpoints and message schemas for a set of example endpoints.

Get Academic Summary (Services/Get_Academic_Summary)

The services/get_academic_summary endpoint provides a summary of academic and educational data, including dates of attendance, degrees achieved, and other fields. The following shows example request and response payload schemas.

| HEADER PARAMETERS | |
|---|---|
| version | Number (Version number of the System API you wish to integrate.) |
| Authorization | string <bearer <API_KEY>> |
| | Authorization API Key |
| Content-type | string <application/json> |
| | Content-type of the request payload. System accepts content in application/json format unless specified otherwise |

| REQUEST BODY SCHEMA: application/json | |
|---|---|
| individual required | object |
| callback | object |

Responses
200: Successful Response

| RESPONSE SCHEMA: application/json | |
|---|---|
| individual | object |
| transaction_id | string |
| | Unique ID of this transaction. |
| processing_status | string |
| | Enum: "COMPLETED" "ACQUIRING" "IN_PROGRESS" |
| | Processing status of the request. COMPLETED - System has finished processing of the request. ACQUIRING - We have received the request and system is acquiring the academic summary. Note that if System requires any intervention from our team, the status will update to IN_PROGRESS. IN_PROGRESS - We have received the request and our team is working to process the academic summary. |
| academic_summary | Array of objects (Academic Summary) |

Get Enrollment Status (Services/Get_Enrollment_Status)

The services/get_enrollment_status endpoint provides an assessment of an individual user's enrollment status. In one implementation, data processing system 104 uses a set of heuristics applied to transcript data retrieved from a Data Source to make a final determination. These heuristics are summarized in Reason Codes as detailed in the following table. While data processing system 104 may access an entire transcript and/or other source data associated with an individual, it only returns to the recipient entity enough information to satisfy the purpose of the initial inquire, such as a Reason Code (or a Boolean value) indicating the user's current enrollment status.

| Reason Codes | |
|---|---|
| Code | Description |
| MES_EXPLICIT_STATUS | Enrollment Status explicitly available on school website |
| MES_CURRENTLY_ENROLLED | Currently enrolled in a program |
| MES_COURSE_IN_PRG | One or more courses in progress |
| MES_COURSE_IN_PRG_DEG_AWD_LT_90 | One or more courses in progress but degree awarded before 90 days of the date available in the data |
| MES_LAST_TERM_LT_180 | Last term ended within 180 days of date available in the data |
| MES_LAST_TERM_LT_180_DEG_AWD_GT_270 | Last term ended within 180 days of item creation but degree awarded date is greater than 270 days |
| MES_COURSE_IN_PRG_DEG_AWD_LT_60 | One or more courses in progress, but degree awarded before 60 days of item creation |
| MES_LAST_TERM_GT_180 | Last term ended greater than 180 days of the date available in the data |
| MES_WITHDRAWN | Withdrawn from all programs |
| MES_INSUFFICIENT_DATA | Insufficient Data |

| HEADER PARAMETERS | |
|---|---|
| version | number<br>Version number of the System API you wish to integrate. |
| Authorization | string <bearer <API_KEY>><br>Authorization API Key |
| Content-type | string <application/json><br>Content-type of the request payload. System accepts content in application/json format unless specified otherwise |

| REQUEST BODY SCHEMA: application/json | |
|---|---|
| individual<br>required | object |

Responses

200: Successful Response

| RESPONSE SCHEMA: application/json | |
|---|---|
| individual | object |
| processing_status | string<br>Enum: "COMPLETED" "ACQUIRING" "IN_PROGRESS"<br>Processing status of the request. COMPLETED- System has finished processing of the request. ACQUIRING - We have received the request and system is acquiring the enrollment status. Note that if System requires any intervention from our team, the status will update to IN_PROGRESS. IN_PROGRESS - We have received the request and our team is working to process the enrollment status. |
| transaction_id | string<br>Unique identifier for this transaction. |
| enrollment_status | Array of objects (Enrollment Status) |

Get Income Summary (Services/Get_Income_Summary)

The services/get_income_summary retrieves a summary of an Individual's income based on the income related Items, including salary and other income related information, retrieved from a Data Source, such as a payroll processing system.

| HEADER PARAMETERS | |
|---|---|
| version | number<br>Version number of the System API you wish to integrate. |
| Authorization | string <bearer <API_KEY>><br>Authorization API Key |
| Content-type | string <application/json><br>Content-type of the request payload. System accepts content in application/json format unless specified otherwise |

| REQUEST BODY SCHEMA: application/json | |
|---|---|
| individual<br>required | object |
| callback | object |

Responses

200: Successful Response

| RESPONSE SCHEMA: application/json | |
|---|---|
| individual | object (Individual)<br>Object representing details of an Individual identified by System |
| transaction_id | string<br>Unique ID of this transaction. |
| processing_status | string<br>Enum: "COMPLETED" "ACQUIRING"<br>Processing status of the request. COMPLETED - System has finished processing of the request. ACQUIRING - We have received the request and system is acquiring the academic summary. |
| income_summary | Array of objects (Income Summary) |

Get Employment Summary (Services/Get_Employment_Summary)

The services/get_employment_summary endpoint retrieves a summary of an Individual's employment based on employment related Items, including history and status, obtained from one or more Data Sources.

| HEADER PARAMETERS | |
| --- | --- |
| version | number |
| | Version number of the System API you wish to integrate. |
| Authorization | string <bearer <API_KEY>> |
| | Authorization API Key |
| Content-type | string <application/json> |
| | Content-type of the request payload. System accepts content in application/json format unless specified otherwise |

| REQUEST BODY SCHEMA: application/json | |
| --- | --- |
| individual required | object |
| callback | object |

Responses
200: Successful Response

| RESPONSE SCHEMA: application/json | |
| --- | --- |
| individual | object (Individual) |
| | Object representing details of an Individual |
| transaction_id | string |
| | Unique ID of this transaction. |
| processing_status | string |
| | Enum: "COMPLETED" "ACQUIRING" |
| | Processing status of the request. |
| | COMPLETED - System has finished processing of the request. |
| | ACQUIRING - We have received the request and system is acquiring the academic summary. |
| employment_summary | Array of objects (Employment Summary) |

Invitations

In one implementation, data processing system 104 offers a framework for initiating the consumer-permissioned data exchange using automatically generated invitations. These invitations contain unique links that refer the user back to a hosted portal in a personalized manner to initiate and complete the consumer-permissioned data exchange. These API endpoints provide a programmatic interface to this framework.

In one implementation, the invitations/new endpoint creates a new Invitation object.

| HEADER PARAMETERS | |
| --- | --- |
| version | number |
| | Version number of the System API you wish to integrate. |
| Authorization | string <bearer <API_KEY>> |
| | Authorization API Key |
| Content-type | string <application/json> |
| | Content-type of the request payload. System accepts content in application/json format unless specified otherwise |

| REQUEST BODY SCHEMA: application/json | |
| --- | --- |
| individual_id | string |
| | Unique ID of the Individual identified by System |
| validity | number |
| | Validity in seconds from the created Timestamp. Default is 259200 seconds (3 days) from the created time stamp. |
| link_only | boolean |
| | Boolean indicating whether to send communication to the Individual or just generate a link. Default is false and System sends the Email Communication to the Individual. If false, individual_id is required. |
| additional_message | string |
| | Additional message that you may want to pass to the candidate in the invitation email. This attribute cannot be used when link_only is false. |
| query_type required | Array of strings |
| | Items Value: "ACADEMIC_SUMMARY" |

Responses
200: Successful Response

| RESPONSE SCHEMA: application/json | |
| --- | --- |
| id | string |
| | System recognized Unique ID of the Invitation |

Data processing system 104 may also include APIs for retrieving a list of outstanding invitations, getting detailed information regarding an invitation, and/or expiring an invitation.

Transcripts

The Transcript resource is the main resource for the transcript object that represents a given user's academic record for one program at a single institution. The resource provides a CRUD-based interface to the transcript object. CRUD is an acronym for CREATE, READ, UPDATE, DELETE. Transcripts are created by submitting Items or "source data", which is then extracted and/or normalized into standard definitions, such as those set forth in Appendix 1. Once a transcript is submitted, the data processing system 104 initiates the data extraction and standardization process. Following this processing, the transcript is available for the full set of API operations, including scoring and other standard or custom analytics.

Depending on the source data type, the processing may require asynchronous communication, i.e., the processing response will happen at some time after the submission request. In the event of asynchronous communication, once the processing of a transcript is complete, application server 106 may receive a notification through a webhook or other notification system implemented by data processing system 104. At that point, an application server 106 may access 1) all the processed data for the transcript using the API supported by data processing system 104, such as /transcripts/get_by_id, 2) processed Digest fields for the transcript using /transcripts/get digest by id, or 3) pass the transcript to/analytics resources hosted at data processing system 104.

Each Transcript resource, in one implementation, generally refers to a single program within a single academic institution. A user's academic record that spans multiple programs across multiple institutions may be submitted in separate transactions so that each Transcript resource follows the single-program per institution guideline. Not doing so may result in errors in the extraction and normalization process.

The following provides certain type definitions that may be used in implementations of the data processing system 104.

School Schema

Table 2A illustrates an example schema for a School object.

TABLE 2A illustrates an example schema for a School object.

| Attribute | Type | Description |
|---|---|---|
| id | string | Unique ID of the school identified by System |
| unit_id | string | Externally recognized Identifier of the school. E.g., IPEDS UNIT ID |
| sis_url | string | URL to the school's SIS, if available. |
| name | string | Name of the school |

Transcript Schema

Table 2B illustrates an example schema for a Transcript object.

TABLE 2B

Transcript Schema

| Attribute | Type | Description |
|---|---|---|
| id | string | Transcript ID, read-only |
| external_id | string | A customer-generated unique identifier linked to the transcript. Customers may have multiple transcripts linked to the same external_id |
| school_unit_id | string | UnitID (as reported in the IPEDS database) of the school and campus that the transcript belongs to |
| source_data | [object] | An array of Source Data objects, with one object per source of academic data within the transcript |
| processing_status | string | Status of data extraction on the transcript, read only |
| | Enum | Values: IN-PROGRESS, COMPLETED |
| raw | object | An object containing the information about the parsed transcript |
| digest | object | Object containing the information about the transcript in a digest format |
| created_at | integer | Timestamp for when the transcript was created, read-only |
| updated_at | integer | Timestamp for when the transcript was last updated, read-only |

Source Data Schema

The Source Data object contains the underlying data for the transcript record. The source data serves as the input to the transcript processing pipeline, i.e., it is the data that is extracted and/or standardized, populating the resulting M1-TRANSCRIPT object. Transcript records can be created with source data from a variety of types, ranging from documents containing unstructured academic data to JSON-based types.

The source data can either be included inline within the source data payload or can be designated by a reference to a remote document containing the data. In the event the source data is inline, the data should be provided in the source_data_value attribute. In the event the data is provided by reference, the reference information is designated in the source_data_reference attribute. These two attributes are exclusive within a Source Data object, i.e., each Source Data object must contain one or the other, but not both. A Source Data object with both value and reference attributes will result in an error.

TABLE 3

Source Data

| Attribute | Type | Description |
|---|---|---|
| referrer | string | Label used to identify the source of the transcript data |
| source_data_type | string ENUM | Format of the source data Values: M1_DIGEST, M1_TRANSCRIPT, OTHER |
| source_data_value | object | Object containing values for source data fields |
| source_data_reference | object | Reference information to a document specifying the source data |

Source Data Reference Schema

TABLE 4

Source Data Reference

| Attribute | Type | Description |
|---|---|---|
| uri | string | URI scheme for a remote document. The supported schemes include the M1 scheme, an internal scheme used to refer to internal System resources. See below for examples. Supported Schemes: M1, HTTP, HTTPS, FTP, SFTP. Format: scheme:[//authority ]path[?query][#fragment] |
| media_type | string | Media type of the source data document Supported Types: application/pdf, application/json, application/msword, image/jpeg, image/png, image/tiff, text/html, text/plain |
| http_method | string | HTTP/S request method Values: GET, POST |
| http_headers | object | HTTP/S request header |
| http_body | object | HTTP/S request body |
| file_name | string | File name of document uploaded through the/transcripts/upload endpoint, read-only |
| created_at | integer | Timestamp for when document containing the source date was provided to System, read-only |

Source Data Types

Data processing system 104 supports transcript source data in a variety of formats as detailed in Table 5 below.

TABLE 5

Source Data Types

| Transcript Data Type | Format | Description |
|---|---|---|
| M1_DIGEST | JSON SCHEMA | A lean transcript format that includes select transcript data fields |
| M1_TRANSCRIPT | JSON SCHEMA | The System full transcript payload |
| OTHER | | Use this type for all other transcript formats. A common use case for this type is for source data provided in a previously uploaded file containing data that is not M1_DIGEST or M1_TRANSCRIPT (e.g., a PDF or JPEG of a transcript). |

M1-Digest Schema

The M1_DIGEST type provides a summary representation of a transcript record and includes key transcript attributes and statistics. The Digest format is structured to be sufficient for several transcript analytics, making it a useful format for creating and scoring transcripts based on user-reported data. The following provides an example payload and schema for the Digest.

```
{
    "degree_type": "BACHELORS",
    "years_in_school": 2,
    "min_grade": "D",
    "cgpa": 3.3,
    "last_term_gpa": 3.5,
    "credits_earned": 65
}
```

TABLE 6
M1_Digest

| Attribute | Type | Description |
| --- | --- | --- |
| degree_type | string | Granular level of study *Standardized Values:* ASSOCIATE, BACHELORS, MASTERS, MASTERS-RESEARCH, DOCTORAL, CERTIFICATE, DIPLOMA, HIGH-SCHOOL-DIPLOMA, NON-DEGREE |
| years_in_school | double | Number of years that the student has been enrolled, including any breaks between enrollments |
| min_grade | string | Lowest grade earned on a course taken *Standardized Values:* A, B, C, D, F |
| cgpa | double | Weighted CGPA, in the 0 to 4 scale, for the combination of courses attended at the transcript-issuing school |
| last_term_gpa | double | GPA, in the 0 to 4 scale, for the last term of attendance |
| credits_earned | double | Total credits earned including transferred credits, converted to a standard semester credit hour system |

M1-Transcript Schema

The following sets forth a format for representing academic transcript data in an example standard format.

| Attribute | Type | Description |
| --- | --- | --- |
| transcript_date | string | Date on which the transcript was issued. transcript date should not be a future date |
| student_id | string | Unique, school-provided Student ID |
| student | object | Object with information about the student, as provided on the transcript |
| previous_academic_record | object | List of previous academic records provided on the transcript. |
| transcript_institution | object | Object with information about the institution for which the transcrip twas issued. |
| academic_summary | object | List of objects providing summary information at degree/institution/transfer level |
| academic_sessions | object | List of academic sessions provided on the transcript |

Student Object:

| Attribute | Type | Description |
| --- | --- | --- |
| first_name | string | First name of the student |
| last_name | string | Last name of the student |
| middle_name | string | Middle name of the student |
| full_name | string | Full name of the student |
| prefix | string | Prefix to the name |
| suffix | string | Suffix to the name |
| former_first_name | string | Former first name |
| former_middle_name | string | Former middle name |
| former_last_name | string | Former last name |
| former_full_name | string | Former full name |
| former_suffix | string | Prefix to the former name |
| former_prefix | string | Suffix to the former name |
| date_of_birth | string | Birthdate of the student (date_of_birth should not be a future date) |
| ssn | string | SSN of the student |
| email | string | Email address of the student, as provided on the transcript |
| address | object | Student's Address information as provided on the transcript |

Address Object:

| Attribute | Type | Description |
| --- | --- | --- |
| addr1 | string | Address line 1 |
| addr2 | string | Address line 2 Should be populated only if addr1 is populated |
| city | string | City |
| state | string | State |
| zipcode | string | Zipcode for the address |
| country | object | Country information |

Country Object:

| Attribute | Type | Description |
| --- | --- | --- |
| name | string | Name of the country |
| a2_code | string | Alpha-2 code for the country from ISO 3166 |

Previous Academic Record Object: List of previous academic records provided on the transcript. This object should have one of name or degrees for a valid record.

| Attribute | Type | Description |
| --- | --- | --- |
| name | string | Name of the institution |
| id_type | string | ID Type of the institution Enum IPEDS, FICE, OTHER` |
| id | string | Unique identifier of the institution e.g., Unit ID like 228246 |
| start_date | string | Start date of the program |
| end_date | string | End date of the program |
| address | object | Address information of the institution |
| degrees | object | List of degrees found in this academic record. |

Degrees Object: List of degrees found in this academic record. For current institution record, if the degree information is provided outside of academic session, the degree will be mapped to appropriate academic session based on awarded date and session's start and end date.

| Attribute | Type | Description |
|---|---|---|
| type | string | Level of the degree. Enum HIGH-SCHOOL-DIPLOMA, ASSOCIATE, BACHELORS, MASTERS, MASTERS-RESEARCH, DOCTORAL, CERTIFICATE, DIPLOMA, NON-DEGREE, PROFESSIONAL, UNDERGRADUATE, UNKNOWN |
| status | string | Status of the degree Enum AWARDED, ENROLLED, WITHDRAWN, TERMINATED, UNKNOWN |
| awarded_date | string | Degree awarded date (for graduated students only) |
| description | string | Literal name of the degree as presented on the transcript |
| academic_summary | [object] | Summary information about the degree |
| field_of_study | [object] | List of objects with information about the field of study. |

Field of Study Object:

A field of study object contains information about a course or field of study associated with a degree—e.g.: MAJOR, MINOR, CONCENTRATION. A valid field of Study object must have values for type and description.

| Attribute | Type | Description |
|---|---|---|
| type | string | Type of study Supported values: MAJOR,MINOR, CONCENTRATION |
| description | string | : Name of the field of study |
| code_type | string | : Type of the code used for identifying the field of study E.g. CIP, HEGIS, OTHER |
| code | string | : Specifies the code for the field of study associated with the academic record. |

Academic Summary Object:

Academic Summary for the context. Represents summary information at a degree or transcript or an academic session level. A valid academic summary object must have values for credit type and level and cumulative summary.

| Attribute | Type | Description |
|---|---|---|
| credit_type | string | Type of credit used E.g. SEMESTER, QUARTER, UNITS, CLOCK-HOURS, CARNEGIE-UNITS, CONTINUING-EDUCATION-UNIT, OTHER |
| level | string | The level of the academic summary. E.g. INSTITUTION, TRANSFER, TOTAL |
| cumulative | boolean | Boolean indicating whether the summary is cumulative. |
| gpa_credits | decimal | Credits attempted on courses that are included in the GPA calculation Should be a non-negative number, if available |
| attempted | decimal | Credits attempted Should be a non-negative number, if available |
| earned | decimal | Credits earned Should be a non-negative number, if available |
| gpa | decimal | Grade Point Average Should be a non-negative number, if available |
| quality_points | decimal | Quality points for grade, used in GPA calculation Should be a non-negative number, if available |

Transcript Institution Object:

Valid transcript_institution object must have id_type and id, preferred id_type is 'IPEDS'

| Attribute | Type | Description |
|---|---|---|
| name | string | Name of the institution |
| id_type | string | Type of ID used to identify given institution E.g. IPEDS, FICE, OTHER |
| id | string | Unique identifier of the institute e.g. UNIT_ID of the institution as per IPEDS |
| address | object | Object with address information |

Academic Sessions Object:

Represents an Academic Session/Term on a transcript. At least one academic session should be available. If academic session object is available then attribute 'type' and one of 'name'/'start date'/'end date' attributes should be available.

| Attribute | Type | Description |
|---|---|---|
| type | string | Type of session E.g. SEMESTER, TRIMESTER, QUARTER, FULL-YEAR, MINI-TERM, SUMMER-SESSION |
| name | string | Name of the session e.g. Fall 2012 |
| start_date | string | Start Date of the session |
| end_date | string | End Date of the session |
| in_progress | boolean | Boolean indicating whether the session is in-progress at the time of transcript_date |
| level | string | Grade Level or Academic Level of the student for the session |
| honors | [string] | Academic honors or awards for the session E.g.: Cum Laude, Summa Cum Laude, Magna Cum Laude |
| curriculum_code_type | string | Type of the code used for identifying curriculum E.g. CIP, HEGIS, OTHER |
| curriculum_code | string | Code identifying the program in which the student i senrolled for this session |
| curriculum_name | string | Name of the program in which the student is enrolled for this session |
| academic_summary | [object] | Summary information about this academic session |
| courses | [object] | List of courses taken in this academic session. At least one of the academic sessions should have courses object |

-continued

| Attribute | Type | Description |
|---|---|---|
| degrees | [object] | List of degrees associated with this academic session.<br>At least one of the academic sessions should have degrees object |

Course Object:
A valid course Object should have one of id or name

| Attribute | Type | Description |
|---|---|---|
| credit_basis | string | Indicates the method of credits earned for the course E.g.: REGULAR_ENROLLMENT TRANSFER ADVANCED_PLACEMENT |
| honors_course | boolean | Indicates if it is honors course or not |
| repeated | boolean | If the course was repeated by the student |
| count_in_gpa | boolean | If the course performance is counted in gpa calculation or not |
| code_type | string | Code designating the system/method of code structure used for Identification Code used to describe the content of the course<br>Enum CIP, HEGIS, OTHER |
| code | string | Course code information as presented on the transcript |
| id | string | Course ID as presented on the transcript |
| name | string | Free-form name to describe the content of the course |
| instructional_setting | string | Type of instructional setting in which a program is provided |
| credits | object | Object with information related to credits for the course |
| start_date | string | Course start date |
| end_date | string | Course end date |

Credits Object:

| Attribute | Type | Description |
|---|---|---|
| credit_type | string | Type of credit used<br>Enum SEMESTER, QUARTER, UNITS, CLOCK-HOURS, CARNEGIE-UNITS, CONTINUING-EDUCATION-UNIT, OTHER (For a valid credits object, credit_type is mandatory) |
| gpa_credits | decimal | Credits attempted on courses that are included in the GPA calculation (Should be a non-negative number, if available) |
| attempted | decimal | Credits attempted (Should be a non-negative number, if available) |
| earned | decimal | Credits earned (Should be a non-negative number, if available) |
| quality_points | decimal | Quality points for grade, used in GPA calculation (Should be a non-negative number, if available) |
| grade_qualifier | string | The grading scale used by an academic institution or the course (Should be a non-negative number, if available) |
| grade | string | Indicates the grade that a student received for participation in the course (Should be a non-negative number, if available) |

The following is example payload for a transcripts object.
Sample Payload
Enrollment Summary Schema
The Enrollment Summary type is a summarized format for representing enrollment in a given transcript.

| Attribute | Type | Description |
|---|---|---|
| transcript_date | string | Date on which the transcript was issued. transcript date should not be a future date |
| student_id | string | Unique, school-provided Student ID |
| student | object | Object with information about the student, as provided on the transcript |
| transcript_institution | object | Object with information about the institution for which the transcript was issued. |
| academic_summary | [object] | List of objects providing summary information at degree/institution level |
| degrees | [object] | List of degrees associated with this transcript. |
| academic_sessions | [object] | List of academic sessions provided onthe transcript (without courses, degrees and academic summary) |

The following is an example payload for an enrollment summary object.
Sample Payload

```
"enrollment_summary": {
    "transcript_date": "04/13/2016",
    "student_id": "10112ABCD",
    "student": {
       "first_name": "John",
       "last_name": "Doe",
       "middle_name": "N.",
       "prefix": "Mr.",
       "suffix": "Jr.",
       "full_name": "Doe,John N.",
       "former_first_name": "Johnny",
```

```
        "former_middle_name": "N.",
        "former_last_name": "Doe",
        "former_full_name": "Doe,Johnny N.",
        "former_suffix": "Jr.",
        "former_prefix": "Mr.",
        "date_of_birth": "1996-03-21",
        "ssn": "XXX-XX-3436",
        "email": "johndoe@example.com",
        "address": {
            "addr1": "3757 Farland Avenue",
            "addr2": "Village View Drive",
            "city": "Liberty Center",
            "state": "FL",
            "zipcode": "33901",
            "country": {
                "name": "United States",
                "a2_code": "US"
            }
        },
        "m1_id": "st_rette2SSjP3GvpVrs5HLol4xor2",
        "other_attributes": {
        }
    },
    "transcript_institution": {
        "name": "California State University-Bakersfield",
        "id_type": "IPEDS",
        "id": "110486",
        "address": {
            "addr1": "9001",
            "addr2": "Stockdale Hwy",
            "city": "Bakersfield",
            "state": "California",
            "zipcode": "93311",
            "country": {
                "name": "United States",
                "a2_code": "US"
            }
        },
        "other_attributes": {
            "college": null,
            "campus": "Bakersfield"
        }
    },
    "degrees": [
        {
            "type": "BACHELORS",
            "status": "GRADUATED",
            "awarded_date": "2018-05-25",
            "description": "Bachelors of Science",
            "academic_summary": [
                {
                    "credit_type": "SEMESTER",
                    "level": "TOTAL",
                    "cumulative": true,
                    "gpa_credits": 91,
                    "attempted": 127,
                    "earned": 127,
                    "gpa": 3.74,
                    "quality_points": 341
                }
            ],
            "field_of_study": [
                {
                    "type": "MAJOR",
                    "description": "Biology",
                    "code_type": null,
                    "code": null
                }
            ],
            "years_of_study": 4,
            "other_attributes": {
            }
        }
    ],
    "academic_summary": [
        {
            "credit_type": "SEMESTER",
            "level": "TOTAL",
            "cumulative": true,
            "gpa_credits": 91,
            "attempted": 127,
            "earned": 127,
            "gpa": 3.74,
            "quality_points": 341
        }
    ],
    "academic_sessions": [
        {
            "type": "SEMESTER",
            "name": "Fall 2014",
            "start_date": "2014-08-20",
            "end_date": "2014-12-22",
            "in_progress": false,
            "level": "Freshman",
            "honors": [
                "Dean's List"
            ],
            "curriculum_code_type": null,
            "curriculum_code": null,
            "curriculum_name": null
        },
        {
            "type": "SEMESTER",
            "name": "Spring 2018",
            "start_date": "2018-01-04",
            "end_date": "2018-05-15",
            "in_progress": false,
            "level": "Senior",
            "honors": [
                "Dean's List"
            ],
            "curriculum_code_type": null,
            "curriculum_code": null,
            "curriculum_name": null
        }
    ]
}
```

Schools

The school resource supported by data processing system 104 helps in integrating various functionalities around transcript processing with a developer application flow. Data processing system 104 maintains the latest list of schools, their access information and meta-data that developers can seamlessly integrate.

Schools Endpoints

Get Schools List

POST /schools/get

The following endpoints help in integrating M1LINK (see below) without using the drop-in module.

| Parameters | type | Required? | Description |
| --- | --- | --- | --- |
| a2_code | string | Yes | A2 Code of the country for which you want to fetch the list of schools. |

The following is an example sample_input.json for getting schools.

```
{
    "a2_code": "US",
}
```

Response Payload may be a list of schools in the country specified.

Sample Response

```
[
  {
    "m1_id": "sch_CV8e5Lsvv2S8Wiz9Bpwpr81m9Ay",
    "name": "University of Michigan-Ann Arbor",
    "sis_url": "https://weblogin.umich.edu",
    "id":"170976",
    "id_type": "IPEDS UNIT ID"
  },
  {
    "m1_id": "sch_CV8e5DJnP9CJ3pN29BztWZv3KIw",
    "name": "Cuny Bernard M Baruch College",
    "sis_url": "https://home.cunyfirst.cuny.edu/",
    "id":"190512",
    "id_type": "IPEDS UNIT ID"
  },
]
```

Transcript Endpoints

Create Transcript

POST /transcripts/new

The /transcripts/new endpoint creates a new transcript object for further processing or to generate analytics. The request payload should include either a source_data_value object or a source_data_reference object. If the attribute values for a transcript are known, the application may send the source data inline in the request using the source_data_value object. If the data is in a document, the application may upload it using the /transcripts/upload endpoint or make it available at a remote location. A reference to the uploaded document should then be included in the request using the source_data_reference object. The following is a sample request and schema for didactic purposes:

Sample Request

```
curl "https://api.measureone.com/v1/transcripts/new"
-H "Authorization: bearer 536835b6-77ca-403d-88ef-b3c72580e070"
-H "Content-Type: application/json"
-H "version: 2020011001"
-d "@sample_input.json"
-X POST
```

Request Payload: With Source Data Sent Inline

| Attribute | Type | Required? |
| --- | --- | --- |
| external_id | string | No |
| school_unit_id | string | No |
| source_data | [object] | Yes, include one source data object containing the complete academic record for the transcript. Multiple source data objects containing source_data_value attributes will result in an error. |

| Attribute | Type | Required? |
| --- | --- | --- |
| referrer | string | No |
| source_data_type | string ENUM | Yes, we currently support creating new transcripts with inline payloads in the M1_DIGEST format |
| source_data_value | object | Yes, in the M1_DIGEST schema |

Sample_Input.Json with an Inline Source Data Payload

```
{
  "external_id": "ABCDECD",
  "source_data": [
    {
      "referrer": "USER",
      "source_data_type": "M1_DIGEST",
      "source_data_value":
          "degree_level": "UNDERGRADUATE"
          "degree_type": "BACHELORS",
          "years_in_school": 2.0,
          "min_grade": "D",
          "cgpa": 3.3,
          "last_term_gpa": 3.5,
          "credits_earned": 65.0
      }
    }
  ]
}
```

Request Payload: With a Reference to Source Data

| Attribute | Type | Required? |
| --- | --- | --- |
| external_id | string | No |
| school_unit_id | string | No |
| source_data | [object] | Yes, include one or more source data objects with references to documents that, when combined, provide a complete academic record for the transcript | source_data Object:

| Attribute | Type | Required? |
| --- | --- | --- |
| referrer | string | No |
| source_data_type | string ENUM | Yes, choose OTHER for all source data that isn't an M1_DIGEST or M1_TRANSCRIPT |
| source_data_reference | object | Yes | source_data_reference Object for Files Uploaded Using /transcripts/upload:

| Attribute | Type | Required? |
| --- | --- | --- |
| uri | string | Yes, include the ml scheme uri returned in the response to /transcripts/upload |
| media_type | string | Yes |

Sample_Input.Json with a Reference to Files Uploaded Using /Transcripts/Upload

```
{
  "external_id": "ABCDECD",
  "school_unit_id": "420316",
  "source_data": [
    {
      "referrer": "USER",
      "source_data_type": "OTHER",
      "source_data_reference": {
        "uri": "ml://sdr_CaIGVqBRRpETI6fkCyUSpNHbHFo",
        "media_type": "application/pdf"
      }
    },
    {
      "referrer": "USER",
      "source_data_type": "OTHER",
```

```
      "source_data_reference": {
        "uri": "m1://sdr_DaKTVqBRRpEEI3fkCbUSpNHbkFm",
        "media_type": "application/pdf"
      }
    }
  ]
}
```
source_data_reference Object for Files Uploaded to a Remote Location:

| Attribute | Type | Required? |
|---|---|---|
| uri | string | Yes |
| media_type | string | Yes |
| http_method | string | Required for HTTP/S requests |
| http_headers | object | Required for HTTP/S requests |
| http_body | string | Required for HTTP/S requests |

Sample_Input.Json with a Reference to Files at a Remote Location

```
{
  "external_id": "ABCDECD",
  "school_unit_id": "420316",
  "source_data": [
    {
      "referrer": "USER",
      "source_data_type": "OTHER",
      "source_data_reference": {
        "uri": "sftp://john.doe:shah@examplesftp.net/path/to/directory/fileY.html",
        "media_type": "text/html"
      }
    },
    {
      "referrer": "USER",
      "source_data_type": "OTHER",
      "source_data_reference": {
        "uri": "https://example.com/path/to/directory/file_name.extension?query_params1&query_param_2",
        "media_type": "text/html",
        "http_method": "POST",
        "http_headers": {
          "authorization" : "bearer 863268e5-82yr-927h-33ks-h6y82548d284",
          "customer_header": "customer_header_value"
        },
        "http_body": "ESCAPED%20STRING"
      }
    }
  ]
}
```

Response Payload

Data processing system 104 may create a transcript object for the created transcript with the following attributes:

| Attribute | Type | Description |
|---|---|---|
| id | string | ID of the created transcript |
| processing_status | string | COMPLETED for transcripts created with source data in inline payloads IN-PROGRESS for transcripts created with source data in uploaded documents |

Sample Response

```
{
  "id": "trc_Cevp4Jw9CIsEeNjpgAAjy2EZt3R",
  "processing_status": "IN_PROGRESS"
}
```

Upload Transcript Data

POST /transcripts/upload

The /transcripts/upload endpoint is used to upload documents containing source data for a new transcript.

Request Payload

| Attribute | Type | Required? |
|---|---|---|
| files | [files] | Yes Supported File Types: DOC, HTML, JPG, JSON, PDF, PNG, TIFF, TXT |

Sample Request

```
curl "https://api.measureone.com/v1/transcripts/upload"
-H "Authorization: bearer 536835b6-77ca-403d-88ef-b3c72580e070"
-F "files[ ]=@/path/to/fileX.pdf"
-F "files[ ]=@/path/to/fileY.pdf"
-X POST
```

Response Payload

The response payload may include an array of Source Data Reference Objects, one object for each uploaded document. The uri returned in the response may be used to link the uploaded documents to a new transcript, as in the example provided herein Sample Response

```
[
  {
    "uri": "m1://sdr_CaIGVqBRRpETI6fkCyUSpNHbHFo",
    "file_name": "fileX.pdf",
    "created_at": 1561613398393
  },
  {
    "uri": "m1://sdr_DaKTVqBRRpEEI3fkCbUSpNHbkFm",
    "file_name": "fileY.pdf",
    "created_at": 1566455776896
  }
]
```

Get Transcript
POST /transcripts/get_by_id

The /transcripts/get_by_id endpoint allows developers to retrieve transcript metadata and transcript data fields. The endpoint can be used once the processing_status for a transcript is COMPLETE. It will return raw values, standardized values and processing codes for all attributes in the M1_TRANSCRIPT schema.

Request Payload

| Attribute | Type | Required? |
| --- | --- | --- |
| id | string | Yes |

Sample Request

```
curl "https://api.measureone.com/v1/transcripts/get-_by_id"
-H "Authorization: bearer 536835b6-77ca-403d-88ef-b3c72580e070"
-H "Content-Type: application/json"
-d "@sample_input.json"
-X POST
sample_input.json
```

```
{
  "id": "trc_TSEne2SSjP3GvpVrs5HLol4xor2"
}
```

Response Payload

Transcript Object for the created transcript, in which the raw object is in the M1_TRANSCRIPT schema and digest object is in M1_DIGEST schema.
Sample Response when source_data_type is not M1_DIGEST Get Enrollment Summary
POST /transcripts/get_enrollment_summary The /transcripts/get enrollment summary endpoint allows developers to retrieve transcript metadata and a summary of the student's enrollment for the submitted transcript. The endpoint can be used once the processing_status for a transcript is COMPLETE. It will return the ENROLLMENT_SUMMARY schema.

Request Payload

| Attribute | Type | Required? |
| --- | --- | --- |
| id | string | Yes |

Response Payload

Transcript Object for the created transcript, with an enrollment_summaryobject with verified fields from the transcript.

Sample Request

```
curl
"https://api.measureone.com/v2/transcripts/get_enrollment_summary"
-H "Authorization: bearer 536835b6-77ca-403d-88ef-b3c72580e070"
-H "Content-Type: application/json"
-H "version: 2020011001"
-d "@sample_input.json"
-X POST
sample_input.json
{
  "id": "trc_TSEne2SSjP3GvpVrs5HLol4xor2"
}
```

Sample Response when source_data_type is not M1_DIGEST

```
{
  "id": "trc_TSEne2SSjP3GvpVrs5HLol4xor2",
  "external_id": "ABCDECD",
  "school_unit_id": 151351,
  "source_data": [
    {
      "referrer": "TLINK_SCHOOL",
      "source_data_type": "OTHER",
      "source_data_reference": {
        "uri": "m1://sdr_1KXGeat97YnOR8AHM4AZWYOAcog",
        "media_type": "application/pdf",
        "file_name": "fileX.pdf",
        "created_at": 1556781221243
      }
    }
  ],
  "enrollment_summary": {
    "transcript_date": "04/13/2016",
    "student_id": "10112ABCD",
    "student": {
      "first_name": "John",
      "last_name": "Doe",
      "middle_name": "N.",
      "prefix": "Mr.",
      "suffix": "Jr.",
      "full_name": "Doe,John N.",
      "former_first_name": "Johnny",
      "former_middle_name": "N.",
      "former_last_name": "Doe",
      "former_full_name": "Doe,Johnny N.",
      "former_suffix": "Jr.",
      "former_prefix": "Mr.",
      "date_of_birth": "1996-03-21",
      "ssn": "XXX-XX-3436",
      "email": "johndoe@example.com",
      "address": {
        "addr1": "3757 Farland Avenue",
        "addr2": "Village View Drive",
        "city": "Liberty Center",
        "state": "FL",
        "zipcode": "33901",
        "country": {
          "name": "United States",
          "a2_code": "US"
        }
      },
      "m1_id": "st_rette2SSjP3GvpVrs5HLol4xor2",
      "other_attributes": {
      }
    },
    "transcript_institution": {
      "name": "California State University-Bakersfield",
      "id_type": "IPEDS",
      "id": "110486",
      "address": {
        "addr1": "9001",
        "addr2": "Stockdale Hwy",
        "city": "Bakersfield",
        "state": "California",
        "zipcode": "93311",
        "country": {
          "name": "United States",
```

```
        "a2_code": "US"
      }
    },
    "other_attributes": {
      "college": null,
      "campus": "Bakersfield"
    }
  },
  "degrees": [
    {
      "type": "BACHELORS",
      "status": "GRADUATED",
      "awarded_date": "2018-05-25",
      "description": "Bachelors of Science",
      "academic_summary": [
        {
          "credit_type": "SEMESTER",
          "level": "TOTAL",
          "cumulative": true,
          "gpa_credits": 91,
          "attempted": 127,
          "earned": 127,
          "gpa": 3.74,
          "quality_points": 341
        }
      ],
      "field_of_study": [
        {
          "type": "MAJOR",
          "description": "Biology",
          "code_type": null,
          "code": null
        }
      ],
      "years_of_study": 4,
      "other_attributes": {
      }
    }
  ],
  "academic_summary": [
    {
      "credit_type": "SEMESTER",
      "level": "TOTAL",
      "cumulative": true,
      "gpa_credits": 91,
      "attempted": 127,
      "earned": 127,
      "gpa": 3.74,
      "quality_points": 341
    }
  ],
  "academic_sessions": [
    {
      "type": "SEMESTER",
      "name": "Fall 2014",
      "start_date": "2014-08-20",
      "end_date": "2014-12-22",
      "in_progress": false,
      "level": "Freshman",
      "honors": [
        "Dean's List"
      ],
      "curriculum_code_type": null,
      "curriculum_code": null,
      "curriculum_name": null
    },
    {
      "type": "SEMESTER",
      "name": "Spring 2018",
      "start_date": "2018-01-04",
      "end_date": "2018-05-15",
      "in_progress": false,
      "level": "Senior",
      "honors": [
        "Dean's List"
      ],
      "curriculum_code_type": null,
      "curriculum_code": null,
      "curriculum_name": null
```

```
        }
      ],
      "processing_status": "COMPLETED",
      "created_at": 1556781225343,
      "updated_at": 1556781257964
    }
}
```

Get Digest

POST /transcripts/get digest by id

The /transcripts/get digest by id endpoint allows developers to retrieve transcript metadata and Digest fields. The endpoint can be used once the processing_status for a transcript is COMPLETE. It will return the M1_DIGEST schema.

Request Payload

| Attribute | Type | Required? |
| --- | --- | --- |
| id | string | Yes |

Sample Request

```
curl "https://api.measureone.com/v2/transcripts/upload"
-H "Authorization: bearer 536835b6-77ca-403d-88ef-b3c72580e070"
-H "version: 2020011001"
-F "files[ ]=@/path/to/fileX.pdf"
-F "files[ ]=@/path/to/fileY.pdf"
-X POST
``` sample_input.json

```
{
  "id": "trc_TSEne2SSjP3GvpVrs5HLol4xor2"
}
```

Response Payload

Transcript Object for the created transcript, in which the transcript information is presented in M1_DIGEST schema.

```
{
  "id": "trc_TSEne2SSjP3GvpVrs5HLol4xor2",
  "external_id": "ABCDECD",
  "school_unit_id": 151351,
  "source_data": [
    {
      "referrer": "M1_PORTAL_SCHOOL",
      "source_data_type": "OTHER",
      "source_data_reference": {
        "uri": "m1://sdr_1KXGeat97YnOR8AHM4AZWYOAcog",
        "media_type" : "application/pdf",
        "file_name": "fileX.pdf",
        "created_at": 1556781221243
      }
    }
  ],
  "digest": {
    "degree_type": "BACHELORS",
    "years_in_school": 2,
    "min_grade": "D",
    "cgpa": 3.76,
    "last_term_gpa": 3.52,
    "credits_earned": 123
```

```
},
    "processing_status": "COMPLETED",
    "created_at": 1556781225343,
    "updated_at": 1556781257964
}
```

Get Transcript Files
GET /transcripts/get files

The /transcripts/get files endpoint allows developers to download source data files associated with a transcript. The endpoint, in one implementation, returns a ZIP file containing one file (in its original format) per data source for the transcript. This is available only when source data was provided in a document and not an inline payload.
Request Payload

| Attribute | Type | Required? |
|---|---|---|
| id | string | Yes |

Sample Request

```
curl
    "https://api.measureone.com/v1/transcripts/get_files?transcript_id=trc_CV39Blnq2MOHEE2
    eMQ9C9Cb2LOI"
-H "Authorization: bearer 536835b6-77ca-403d-88ef-b3c72580e070"
-X GET --output transcripts.zip
```

Response Payload

When the HTTP response code is 200, the response is of type application/zip and returns a ZIP file containing source data files for the transcript. The file name will be the transcript ID. For all other response codes, the response is of type application/json and returns a standard Error object.
Sample Success Response
    File: transcripts.zip
Sample Error Response

```
{
    "error_code": "INVALID_CREDENTIALS",
    "http_code": 401,
    "request_id": "req_CRT8vDjmSiAynRPIK29CN38d3Pe",
    "error_message": "Unauthorized for the requested operation"
}
```

Analytics

Developers may use the extracted and normalized transcript data to develop their own proprietary models. Data processing system 104, in one implementation, also supports resources that provide analytics and scores based on transcript data. An application may send a transcript to an/analytics endpoint when its processing_status is "COMPLETED". For example, a request to services/meritscore or /analytics/meritscore returns a MeritScore for a transcript, a score indicative of default credit risk. In another example, a request to services/gradscore or /analytics/gradscore returns a GradScore for a transcript, a score indicative of graduation likelihood. In one implementation, both scoring models are based on data sets and machine learning techniques that link academic achievement and future individual behavior (e.g., as consumers of credit and/or educational services). In addition to the raw and standardized transcript information, data processing system 104 may identify a set of derivative metrics during processing—such as the average number of courses completed in a given term, standardized grade point average, grade point average trend, and the like. The transcript statistics, such as average courses completed each term and number of courses, provide a first level of analysis of the transcript, increasing utility and accelerating decision-making. In one implementation, MeritScore may be based on federal student loan data and also include other credit history data. GradScore is based on academic data including graduation information. In either case, machine learning techniques—such as feature extraction, gradient boosting, ensembling, etc.—can be used to derive various aspects of academic transcript data that are significant to a target.

MeritScore and GradScore provide mechanisms for comparing individuals in a given dataset in that each individual score characterizes an approximate difference between individuals relative to a target behavior (such as credit default (MeritScore) or graduation (GradScore)). In one implementation, both scores are scaled such that a certain score corresponds to a selected good/bad odds ratio. A "points to double the odds" formula may be used to adjust the score based on the inputs. For example, in one implementation, a block of 40 points on the scoring scale corresponds to a doubling of the odds of a target event (e.g., default, graduation, etc.).

MeritScore
POST /analytics/meritscore or/services/meritscore

MeritScore is a scoring model that establishes predictive links between individualized academic data and credit performance. MeritScore enables financial institutions and credit providers with better decision-making tools when evaluating the credit-worthiness of individuals with limited financial history. MeritScore may be scaled similarly to a FICO score, providing a standard metric for comparison. In one implementation, the data processing system 104 derives an M1_DIGEST from a given transcript. The M1_DIGEST is the input to the scoring model. In the implementation described below, data processing system 104 may compute a MeritScore for any transcript that has validated, non-null values for required M1_DIGEST fields and processing_status="COMPLETED". The following sets forth example M1_DIGEST fields, as well as example request and response formats. As discussed herein, the M1_DIGEST fields can be received directly from users as part of a pre-screening process with later verification by obtaining transcript data directly from one or more academic institutions.

M1_DIGEST Attrib

| M1_DIGEST Attribute | Required? |
|---|---|
| degree_type | Yes |
| years_in_school | Yes |
| min_grade | Yes |
| cgpa | Yes |

-continued

| M1_DIGEST Attribute | Required? |
|---|---|
| last_term_gpa | Yes |
| credits_earned | Yes |

Request Parameters

| Attribute | Type | Description |
|---|---|---|
| transcripts | [string] | An array of transcript IDs to be scored NOTE: System currently supports scoring single transcripts and will return an error if more than one id is included in the request |
| id | string | System generated transcript ID |

Sample Request

```
curl "https://api.measureone.com/v2/analytics/meritscore"
-H "Authorization: bearer 536835b6-77ca-403d-88ef-b3c72580e070"
-H "Content-Type: application/json"
-H "version: 2020011001"
-d "@sample_input.json"
-X POST
``` sample_input.json

```
{
    "transcripts": [
        {
            "id": "trc_TSEne2SSjP3GvpVrs5HLol4xor2"
        }
    ]
}
```

Response Parameters

| Attribute | Type | Description |
|---|---|---|
| merit_score | decimal | System's MeritScore for the requested transcript |
| aa_code_1 | integer | First adverse action code that can be used for decline decisions |
| aa_code_2 | integer | Second adverse action code that can be used for decline decisions |
| aa_code_3 | integer | Third adverse action code that can be used for decline decisions |

Adverse Action Reasons

| Adverse Action Code | Adverse Action Reason |
|---|---|
| 1 | Overall academic performance could be improved |
| 2 | Academic performance has concerning trend |
| 3 | Meaningful progress has not been made toward successful completion of studies |
| 4 | Academic performance is not steady and stable |

Sample Response

```
{
    "merit_score": 698,
    "aa_code_1": 3,
    "aa_code_2": 1,
    "aa_code_3": 4,
    "version": "v1.2"
}
```

GradScore

POST /analytics/gradscore

GradScore is a scoring model that establishes the relationship between historical transcript data and academic persistence. This proprietary score may be used as a metric for predicting a student's future academic performance, giving financial aid, admissions, and counseling professionals confidence in decisions on where to direct their limited institutional resources. The GradScore can be computed on any transcript that has validated, non-null values for required M1_DIGEST fields and processing_status="COMPLETED". The following sets forth example M1_DIGEST fields, as well as example request and response formats.

| M1_DIGEST Attribute | Required? |
|---|---|
| degree_type | yes |
| years_in_school | yes |
| min_grade | yes |
| cgpa | yes |
| last_term_gpa | yes |
| credits_earned | yes |

Request Parameters

| Request Parameters | | |
|---|---|---|
| Attribute | Type | Description |
| transcripts | [string] | An array of transcript IDs to be scored NOTE: System currently supports scoring single transcripts and will return an error if more than one id is included in the request |
| id | string | System generated transcript ID |

Sample Request

```
curl "https://api.measureone.com/v2/analytics/gradscore"
-H "Authorization: bearer 536835b6-77ca-403d-88ef-b3c72580e070"
-H "Content-Type: application/json"
-H "version: 2020011001"
-d "@sample_input.json"
-X POST
``` sample_input.json

```
{
    "transcripts": [
        {
            "id": "trc_TSEne2SSjP3GvpVrs5HLol4xor2"
        }
    ]
}
```

Sample Response

```
{
  "grad_score": 652,
  "aa_code_1": 2,
  "aa_code_2": 3,
  "aa_code_3": 1,
  "version": "v1.1"
}
```

Response Parameters

Response Parameters

| Attribute | Data Type | Description |
|---|---|---|
| grad_score | decimal | System's GradScore for the requested transcript |
| aa_code_1 | integer | First adverse action code that can be used for decline decisions |
| aa_code_2 | integer | Second adverse action code that can be used for decline decisions |
| aa_code_3 | integer | Third adverse action code that can be used for decline decisions |

Adverse Action Reasons
Adverse Action

| Code | Adverse Action Reason |
|---|---|
| 1 | Overall academic performance could be improved |
| 2 | Academic performance has concerning trend |
| 3 | Meaningful progress has not been made toward successful completion of studies |
| 4 | Academic performance is not steady and stable |

Generate a MeritScore Based on User-Reported Data

The MeritScore is an analytic that correlates credit performance to academic data. Depending on the location within the customer user experience, requesting the user to submit a full transcript may not be appropriate. An important example of such a use case would be a pre-approval stage at the top of a lending funnel. In these cases, using user-reported data to generate a score, which may be verified at a later time by scoring the full transcript, is often the right design.

To address this use case, data processing system 104, as discussed above, provides a "Digest" data type that enables customers to submit a summary of the transcript data, rather than the full transcript record itself. This summary is structured so as to be sufficient to generate a MeritScore.

In one example embodiment, the detailed flow to do this would then be as follows:

First, call /transcripts/new with source_data_type="M1_DIGEST" and digest data fields in the source_data_value object. This creates a new transcript object and returns its transcript ID in the response.

Then, call /analytics/meritscore or /services/meritscore for that transcript ID, and you'll get the MeritScore in the response.

Webhooks

In one implementation, data processing system 104 uses webhooks to notify client applications of certain events. Whenever a notification event occurs, the data processing system 104 submits a POST to a developer-designated webhook URL with information about the event. The webhook URL may be configured as part of the developer onboarding process. In one implementation, the webhook notifications support OAuth 2.0 and Basic Auth for authorization. The API key configured during the setup of the webhook in the developer onboarding process, will be present in the Authorization header. In addition, the User-Agent for the requests will have the prefix M1-Webhook/.

Sample Webhook Payload

```
{
  "transcript_id": "trc_TSEne2SSjP3GvpVrs5HLol4xor2",
  "external_id": "ABCDECD",
  "event": "transcript.created"
}
```

| Attribute | Type | Description |
|---|---|---|
| transcript_id | string | System generated transcript ID |
| external_id | string | A customer-generated unique identifier linked to the transcript. Customers may have multiple transcripts linked to the same external_id. |
| event | string | Transcript events that trigger webhook notifications |

DEFINITIONS ENUM

The supported notification events are in the following table:

| Event | Description |
|---|---|
| academic.account.authenticated | An academic account for an individual has been successfully authenticated |
| academic.item.created | An academic item (transcript/individual profile) has been created and is pending processing to extract data "processing_status": "IN_PROGRESS" |
| transcript.created | The transcript object has been created and is pending processing to extract data "processing_status": "IN_PROGRESS" |
| transcript.processed | The transcript object has been processed and data is available to be pulled "processing_status": "COMPLETED" |
| academic.item.processed | The academic item has been processed and data is available to be pulled "processing_status": "COMPLETED" |
| transaction.processed | The transaction has been processed and data is available to be pulled |
| unprocessable.entity | Raised in the event of an item received by the system, such as a transcript, cannot be processed by the system |
| session.rejected | The LINK session cannot be processed |
| session.no_login | The user cannot login to their school using LINK |

To acknowledge receipt of a webhook, a developer endpoint should return a 2xx HTTP status code. Any other information returned in the response headers or response body is ignored.

M1LINK

As described in more detailed below, data processing system 104 supports session proxy functionality by which source data associated with an individual user may be gathered in a manner that is permissioned by the user and that assures the provenance of the source data. In a particular implementation, data processing system 104 supports functionality allowing developers to retrieve transcript data directly from student information systems associated with one or more academic institutions. In some implementations, this retrieval functionality (M1LINK) can be integrated into a developer application flow through a widget provided by data processing system 104 or by calling APIs hosted by data processing system 104. Widget integration may require embed code and JavaScript code. In one example workflow, a user provides required details on the widget and submits the credentials. Following successful submission of credentials with certain parameters (see below), data processing system 104 confirms a connection to user's academic account with a success response back to the widget. Following retrieval of a transcript, data processing system 104 may trigger a webhook notification with external id and transcript id.

The following is example embed code that may be used.

```
<app-transcript-link access_key="5ca3dd-b22a-441c-beb0-6b1b28d9d"
external_id="app_id" ></app-transcript-link>
```

Parameters

| Parameters | type | Source | Description |
|---|---|---|---|
| school_id | string | Widget | System provided unique identifier of the school. User selects school from the dropdown in the widget |
| user_name | string | Widget | User name to login to user's University website where academic record can be accessed |
| password | string | Widget | Password to authenticate and connect user's University account to System |
| external_id | string | Customer Application | A customer generated unique identifier of the user. It is part of the embed code |
| access_key | string | Customer Application | System provided API access_key. IT is part of the embed code |

M1LINK Endpoints

Access Transcript.

The following endpoints help in integrating M1LINK without using the drop-in module.

POST /M1LINK/access_transcript

The /M1LINK/access transcript endpoint retrieves the transcript from the student information service 107 of a given academic institution. The calling system will receive webhook notifications as the transcript moves through the proxied session and data processing pipeline.

Sample Request

```
curl "https://api.measureone.com/v2/M1LINK/access_transcript"
-H "Authorization: bearer 536835b6-77ca-403d-88ef-b3c72580e070"
-H "Content-Type: application/json"
-H "version: 2020011001"
-d "@sample_input.json"
-X POST
```

The following is sample_input.json with the input parameters to access transcript end point.

```
{
  "external_id": "123445",
  "school_id": "sch_e3638c65-daf9-405a-b2d1-e87b3537af75",
  "user_name": "user_name",
  "password": "password"
}
```

| Parameters | type | Req'd? | Description |
|---|---|---|---|
| school_id | string | Yes | A unique identifier of the school. The school information can be retrieved from/schools/get end point (see below) |
| user_name | string | Yes | User name to login to user's University website where academic record can be accessed |
| password | string | Yes | Password to authenticate and connect user's University account to System |
| external_id | string | Yes | A customer generated unique identifier of the user. It is part of the embed code |

Response Payload

Response payload returns a session id. Use HTTP codes to determine if multi-factor authentication is required or not. Sample Response to Access Transcript Endpoint

```
{
  "session_id" : "tls_Cevp4Jw9CIsEeNjpgAAjy2EZt3R"
}
```

2xx Success

A 2xx status code indicates the request was received and processed successfully.

Status

| Status Code | Description |
|---|---|
| 200 | OK-The request is successful |
| 202 | ACCEPTED-The request is Accepted and mfa is required to complete the authentication |

Verify MFA Token

Many academic institutions ask the user for multi-factor authentication. An example M1LINK module supports DUO MFA, if the institution has it enabled. The user is expected to provide the One-Time Password (OTP) that can be submitted for authenticating the user.

POST /M1LINK/verify_mfa

The /M1LINK/verify_mfa endpoint authenticates the user through Multi-Factor-Authentication.

| Parameters | type | Required? | Description |
|---|---|---|---|
| session_id | string | Yes | a provided unique identifier of the session. |
| mfa_token | string | Yes | One time password |

Sample Request

```
curl "https://api.measureone.com/v2/M1LINK/verify_mfa"
-H "Authorization: bearer 536835b6-77ca-403d-88ef-b3c72580e070"
-H "Content-Type: application/json"
-H "version: 2020011001"
```

-continued

```
-d "@sample_input.json"
-X POST
``` sample_input.json with the input parameters to verify_mfa end point

```
{
    "session_id": "tls_Cevp4Jw9CIsEeNjpgAAjy2EZt3R",
    "mfa_token": "51622"
}
Sample Response to verify_mfa endpoint
{
    "session_id" : "tls_Cevp4Jw9CIsEENjpgAAjy2EZt3R"
}
```

Figure 2:
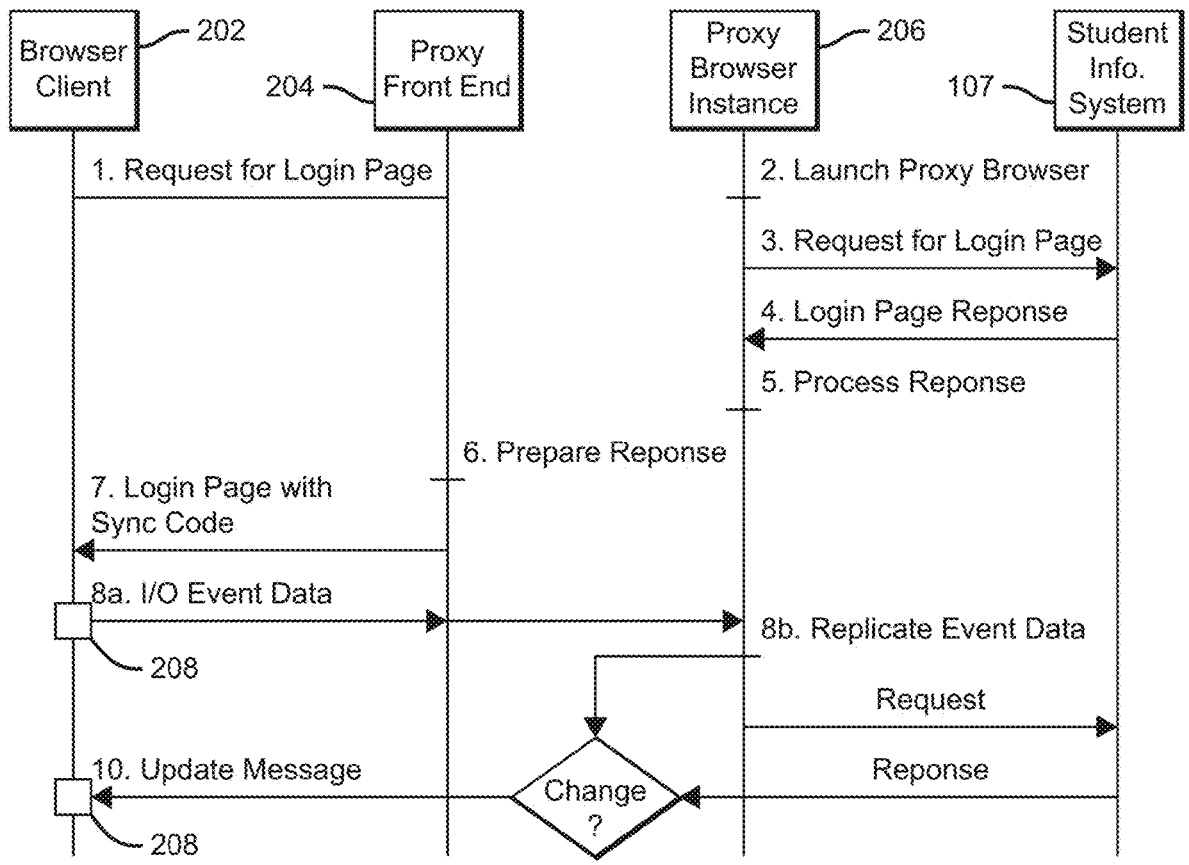
FIG. 2 is a schematic diagram illustrating an example proxy workflow according to one implementation of the disclosure.

FIG. 2 is a diagram illustrating the information flow among various system components during an example transcript (source data) retrieval process utilizing example M1LINK functionality. The example information flow may be initiated using the M1LINK APIs set forth above. In one implementation, a user, using a browser client 202 executing on user client 108*a*, may access application server 106 and transmit a request that launches a transcript retrieval or other source data process. This request may cause application server 106 to transmit a response to browser client 202 that re-directs the browser client 202 to proxy front end 204 of data processing system 104. The redirection messages may include identifiers associated with the user and the application server, as well as other information, such as session identifiers, security tokens, and the like. Proxy front end 204 may transmit a response to browser client 202 prompting for selection of an academic institution, such as a college or university. Data processing system 104 provides a predefined or curated selection of academic institutions. Data processing system 104 also stores corresponding network addresses (e.g., URLs) associated with these academic institutions. Data processing system 104 does not accept network addresses of systems that host source data directly from users in this process, thereby ensuring the provenance of the data source.

As FIG. 2 illustrates, when the user uses browser client 202 to select an academic institution, browser client 202 transmits a request for a login page to the student information system 107 (or other system that hosts desired source data) associated with that academic institution (FIG. 2, Step 1). Receipt of the login request at proxy front end 204 causes the launch of a proxy browsing instance 206 (FIG. 2, Step 2), which transmits a request for a login page to the student information system 107 of the selected academic institution (FIG. 2, Step 3). The proxy browser instance 206, in one implementation, is a browser engine running in a headless or headful mode and may be based on Puppeteer, a node library providing API control of a Chromium-based browser, such as the Chrome browser offered by Google, Inc. of Mountain View, California. The student information system 107 responds by transmitting the login page to proxy browser instance 206 (FIG. 2, Step 4). The proxy browser instance 206 processes the login page content to generate a document object model (DOM) representing the structured document content that is ordinarily displayed in the window of a browser (FIG. 2, Step 5). As part of this processing, the proxy browser instance 206 executes one or more code modules embedded in the content (such as JavaScript) that may cause modifications to the DOM. Proxy front end 204 prepares the content processed by the proxy browser instance 206 to be transmitted to browser client 202 (FIG. 2, Step 6). In one implementation, proxy front end 204 strips or removes scripts and other executable code from the processed version of the content and adds a synchronization code module 208 to the structured document content. Proxy front end 204 transmits the modified structured document content (including a copy of the HTML code for the currently rendered page and the iFrames within the currently rendered page) to the browser client (FIG. 2, Step 7). Still further, a mutation observer executing in connection with proxy browsing instance 206 monitors for changes to structured document content (which may occur due to script execution or I/O related events) and streams updated structured document content to the synchronization code module 208.

The browser client 202 processes the structured document and renders it within a browser window displayed to the user. In this phase, the content displayed to the user may be a login page 402 prompting the user for user credentials to gain access to an account hosted on student information system 107. See FIG. 4. In one implementation, the synchronization code is an executable module (such as a JavaScript module) that establishes a Web Socket connection with proxy front end 204 and monitors for in-focus input/output (I/O) events related to the browser client 202. Such in-focus I/O events can be data relating to movements of a mouse (or other I/O device) within the window of browser client 202, mouse clicks on HTML elements, mouse-over events, touch events, and keyboard inputs. In one implementation, the synchronization code 208 streams event data associated with these I/O events to proxy front end 204. Accordingly, as the user inputs credentials into the login page, the synchronization code 208 streams the credential information as a series of I/O events to proxy front end 204 (FIG. 2, Step 8*a*).

Proxy front end 204 provides the event data to proxy browser instance 206, which uses the event data to replicate the user's interactions with the content rendered at browser client 202 in connection with the structured document processed at proxy browser instance 206 (FIG. 2 Step 8*b*). A mutation observer monitors for changes to content maintained by proxy browser instance 206 (FIG. 2, Step 9) and launches a process that transmits updates to the content to browser client 202 (FIG. 2, Step 10). For example, an embedded JavaScript module executing in connection with the structured document maintained by proxy browser instance 206 may cause the structured document content to change. In another example, a user may mouse over a user interface element. This mouse-over event, when replicated at proxy browser instance 206, may cause JavaScript embedded in the page to modify the DOM maintained by the proxy browser instance 206 to display a dropdown menu. The mutation observer detects these changes, causing proxy front end 204 to transmit an update message to synchronization code 208 over the Web Socket connection. The synchronization code 208 modifies the structured document processed by browser client 202 based on the changes specified in the update message. In another example, the I/O event data may cause proxy browser instance 206 to transmit an HTTP request to student information system 107. The student information system 107 may respond with additional structured document content, such as a landing page after successful authentication. The mutation observer detects these changes and transmits them to synchronization code 208 as update messages for replication at browser client 202. In one implementation, the update messages are JSON-encoded messages. In one implementation, if student information system transmits an entirely new page (e.g., a landing page) to proxy browser instance 206, the processing can loop back to step 5 for the new page—e.g., where native scripts are executed and stripped, and synchronization code is inserted, before sending to browser client 202 and the mutation observer is reinitialized to observe for changes to the rendered version of the new page at proxy browser instance 206.

Figure 4:
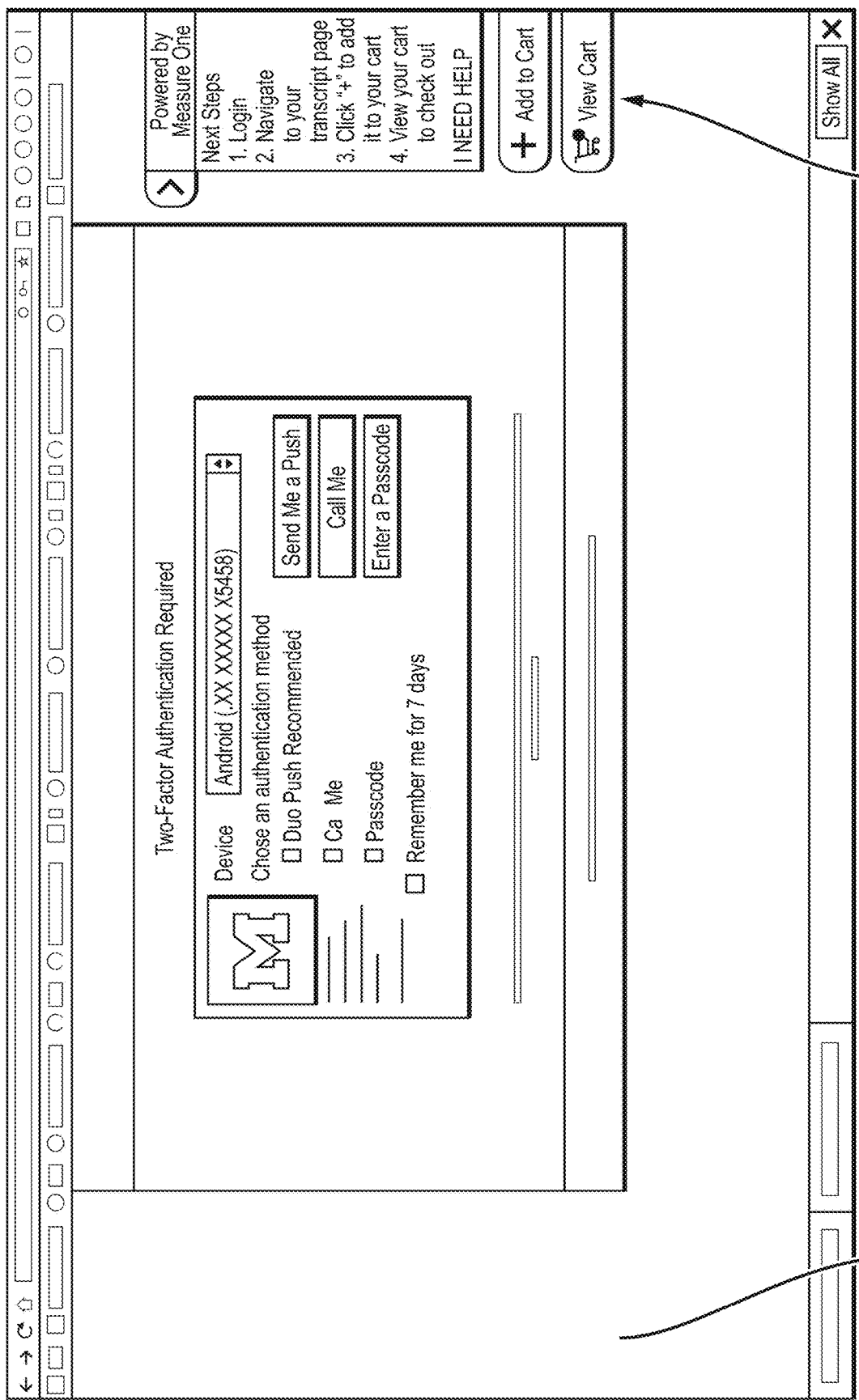
FIG. 4 is a schematic illustrating a graphical user interface including proxy-augmented controls.

Additionally, proxy front end 204 may insert other code modules that augment the functionality of the native content provided by student information system 107. For example, as FIG. 4 illustrates, proxy front end 204 may insert widget code 404 that is not a part of the original page served by student information system 107 and provides a graphical overlay of one or more controls that facilitate the uploading of transcript data retrieved from student information system 107. In the foregoing example, a user may authenticate to student information system 107 and access the user's transcript data. The transcript data may itself be in the form of a structured document, such as a portable document format (PDF) file or an HTML document. When the user has accessed the transcript, the controls provided by the shopping cart code 404, when invoked, launches an automated process that retrieves the transcript data and stores it in a data store maintained by data processing system 104 for additional processing. In one implementation, the data processing system 104 uses the APIs discussed above to process the retrieved academic data. After the user logs out or otherwise terminates the session with student information system 107, the browser client is redirected to application server 106 and the proxy browser instance 206 is also terminated. Any state information associated with the proxy browser instance 206 is also deleted so that no passwords or other information is maintained.

Other implementations are possible. For example, the interactions between browser client 202 and proxy front end 204 may occur within an iframe of an HTML page hosted by application server 106, as opposed to a redirection workflow. In addition, the application server 106 may prompt the user for selection of the academic institution, which gets passed in the iframe or redirection process to proxy front end 204.

Figure 3:
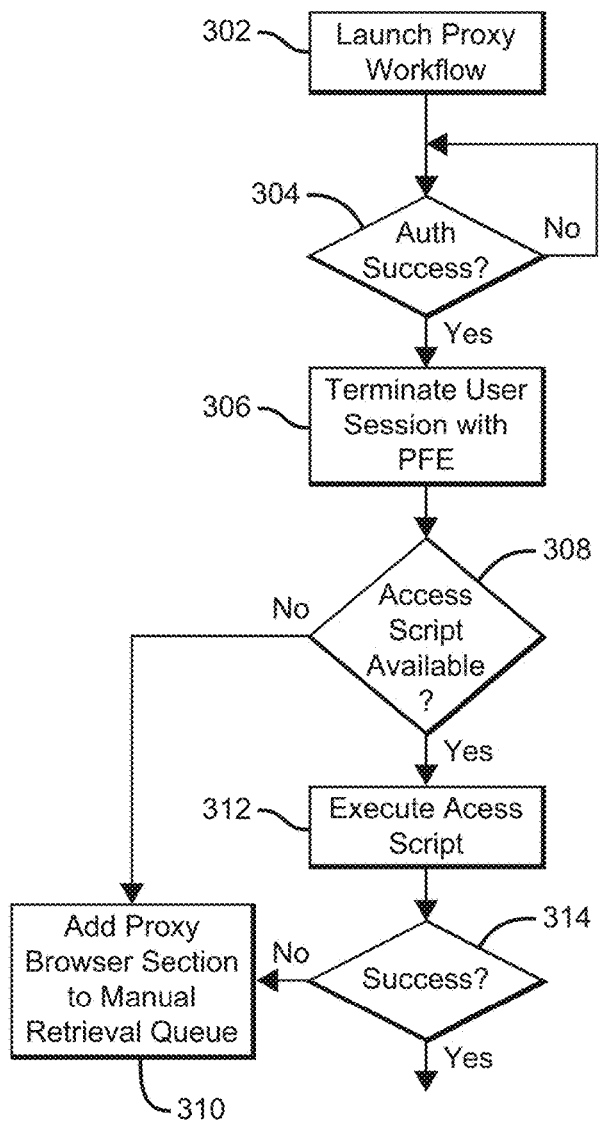
FIG. 3 is a flow chart diagram illustrating a method for implementing embodiments of the disclosure.

Still further, as an example, a modified form of the proxy functionality described above may be used in connection with an automated process that accesses an identified student information system 107 and automatically retrieves information about the student that may include a student's profile, enrollment information and transcript data. In other words, after a user logs into student information system 107, a script executing on proxy browser instance 206 may automatically navigate student information system 107 and retrieve the requisite transcript data. FIG. 3 illustrates an example workflow for automatically retrieving transcript data from a student information system 107. As FIG. 3 shows, in one implementation, after a user requests to retrieve a transcript, application server 106 may initiate the process by causing data processing system 104 to launch the proxy-based session described above (302).

As discussed above, the user may be presented with a login page prompting for user credentials, such as username and password. The login page may be served from either the student information system 107 or a different host than student information system 107. If the login page is served from a different host, the user credentials are passed to proxy browser instance 206 as discussed above. In some implementations, the student information system 107 may implement a two-factor authentication process. In one implementation, if the user successfully authenticates (304), proxy front end 204 terminates the session between browser client 202 and proxy front end 204 (306). However, the session between proxy browser instance 206 and student information system 107 remains active. In the implementation shown, data processing system 104 determines whether it has a transcript access script associated with the academic institution corresponding to the student information system 107 (308). An access script, as discussed in more detail below, is a recorded set of I/O commands or coded instructions that proxy browser instance 206 implements to access and retrieve a transcript from student information system 107. If an access script is available (308), proxy browser instance 206 executes the access script to access and retrieve the transcript data (312). If an access script is unavailable (308) or it fails to retrieve the transcript data, the proxy browser instance 206 session is added to a manual queue (310). While in the manual queue, the proxy browser instance 206 may transmit reload or refresh requests or otherwise transmit messages to student information system 107 in order to keep the session from timing out.

In one implementation, when a proxy browser instance 206 session is added to a queue, a notification is transmitted to an admin associated with data processing system 104. When the admin responds to the notification, the user may login to the proxy browser instance 206 and manually control it in a manner described above to access and retrieve the transcript data. In one implementation, widget code may also be inserted to facilitate submission of the transcript as discussed above. After the user retrieves the transcript data, the session is terminated and the recording is stored for further analysis. As the admin user navigates, the I/O and clickstream events are recorded to generate an access script for the academic institution corresponding to the student information system 107. The recorded events may include mouse positions, touch positions, keyboard strokes, mouseover events, JavaScript events, click events and the like. In implementations that use Puppeteer, the puppeteer instance can be used to control recording of browsing events during the session. The recorded events may be edited to generate the access script that can be later used in an automated process (312) in subsequent accesses. In one implementation, the analysis of the recording examines whether the recording can be used directly for future purposes or whether it should be converted into a program that may need looping or conditional logic. For example, looping or control logic may be needed when an individual has multiple transcripts and the list of transcripts is displayed in a dropdown menu. In such cases, the script may use a coded version of the recording.

Student information system 107 is merely one example of a possible host of source data. The foregoing proxied session functionality for accessing academic source data may also be used to retrieve other types of source data stored at remote hosts in association with individual users. For example, the proxied session functionality described above may be used in connection with payroll processing systems, government records systems, or any other network addressable system where a user's source data is hosted.

Figure 5:
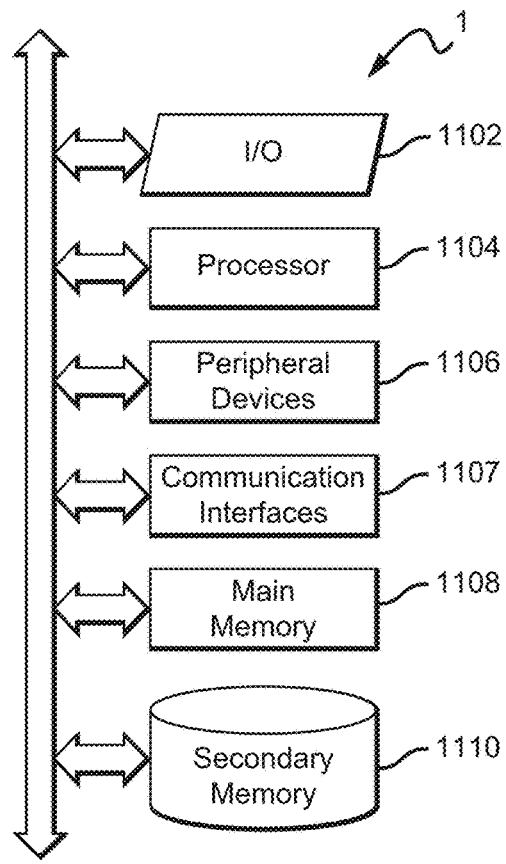
FIG. 5 illustrates an example of a computer system that may be used to execute program code to implement embodiments of the disclosure.

FIG. 5 illustrates an example of a computer system 1100 that may be used to execute program code stored in a non-transitory computer-readable medium (e.g., memory) in accordance with embodiments of the disclosure. Any of the servers 105, user clients 108a-c, and host clients 106, 107 may incorporate the computer system architecture illustrated in the following description. The computer system includes an input/output subsystem 1102, which may be used to interface with human users and/or other computer systems depending upon the application. The i/o subsystem 1102 may include, e.g., a keyboard, mouse, graphical user interface, touchscreen, or other interfaces for input, and, e.g., a LED or other flat screen display, or other interfaces for output, including application program interfaces (APIs). Other elements of embodiments of the disclosure, such as the prioritization engine may be implemented with a computer system like that of computer system 1100.

Program code may be stored in non-transitory media such as persistent storage in secondary memory 1110 or main memory 1108 or both. Main memory 1108 may include volatile memory such as random access memory (RAM) or non-volatile memory such as read only memory (ROM), as well as different levels of cache memory for faster access to instructions and data. Secondary memory may include persistent storage such as solid-state drives, hard disk drives or optical disks. One or more processors 1104 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 1104. The processor(s) 1104 may include graphics processing units (GPUs) for handling computationally intensive tasks.

The processor(s) 1104 may communicate with external networks via one or more communications interfaces 1107, such as a network interface card, WiFi transceiver, etc. A bus 1105 communicatively couples the i/o subsystem 1102, the processor(s) 1104, peripheral devices 1106, communications interfaces 1107, memory 1108, and persistent storage 1110. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 1100. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. For example, implementations of the present invention can be applied to other types of consumer-permissioned data other than academic data, such as employment data, payroll data, membership data, and the like. Therefore, it is intended that the invention be considered as limited only by the scope of the appended claims.

APPENDIX 1

Overview

A standardization API converts data from heterogenous transcript formats into one standardized dataset. All academic transcripts contain similar data but are not easily comparable because of differences in the way institutions record, measure or define the data. Transcripts differ in their grading systems, credit systems, course types, GPA calculation rules, term structures and nomenclature. The underlying logic and standard values are based on insights from over 7000 individual transcripts and our database of school-specific information on grading policies and term structures.

Why Standardize?
1. Cleans and prepares the data for analysis: ensures uniformity in data types, scales/units, and categories for analysis across heterogenous transcripts
2. Addresses data incompleteness: even if a field is not provided on a transcript, whenever possible it is imputed using available data and known relationships
3. Enables comparative analysis: a comparable dataset levels the playing field for all students, ensures robustness of insights and leads to reliable decision-making Interpreting Standardized Data:

The system provides Processing Codes for further information on the standardized value for a transcript.

Transcripts from non-US academic institutions can be standardized if the document is in English and can be reliably converted to US-equivalent grades and credits.

Standardization Guide

M1 Transcript Schema

| Attribute | Description | Standardized Value |
|---|---|---|
| transcript_date | Transcript issue date | mm/dd/yyyy |
| school | Institution issuing transcript | For US Post-Secondary Institutions: As appears in the Integrated Post-Secondary Education Data System (IPEDS). For High Schools and Foreign Institutions: As on transcript |
| school_student_id | Unique school provided student ID | As on Transcript |
| enrollments | object | See Enrollment object |

Enrollment

Standardized values of enrollment-level aggregates such as CGPA or credits earned are calculated using course-level information and MeasureOne's standardized treatment of grades, retaken courses, transfer terms, in-progress terms, missing credits, etc.

| Attribute | Description | Standardized Value |
|---|---|---|
| school_enrollment_id | Unique school provided enrollment ID | As on Transcript |
| enrollment_status ENUM | Enrollment status as of transcript date | GRADUATED (can be imputed), ENROLLED (can be imputed), RE-ENROLLED, LEAVE-OF-ABSENCE, TRANSFERRED-OUT-INTERNAL, TRANSFERRED-OUT-EXTERNAL, PROBATION, TERMINATED, WITHDRAWN |

-continued

| Attribute | Description | Standardized Value |
|---|---|---|
| graduation_date | Graduation ceremony date | mm/dd/yyyy Populated for graduated students only |
| college | College name | As on Transcript |
| campus | Campus name | As on Transcript |
| degrees | object | See Degree object |
| degree_awarded_date | Degree awarded date | mm/dd/yyyy Populated for graduated students only |
| major | object | See Major object |
| minor | object | See Minor object |
| honors | Academic honors or awards for current degree E.g.: Cum Laude, Summa Cum Laude, Magna Cum Laude | As on Transcript |
| credit_system | Method of recording hours of study E.g.: Semester Credits, Quarter Credits, Units, Clock Hours | For Post-Secondary Programs: SEMESTER CREDITS (1 course = 3 credits) For High Schools: UNITS (1 course = 1 or 0.5 unit) |
| credits | object | See Credits object |
| institution_cgpa | CGPA for graded courses taken at the institution | Calculated using MeasureOne standardized grade system Scale: 4-point Formula: (Sum of Quality Points)/(Sum of GPA Credits) Definitions |
| transfer_cgpa | CGPA for transferred courses | null |
| total_cgpa | Total CGPA for current program | See institution_cgpa Note: For total_CGPA, MeasureOne considers only courses taken at the institution on a graded basis |
| last_attended_date | Last attended date at current institution | mm/dd/yyyy Can be imputed based from last term details |
| terms | object | See Term object |

| Attribute | Description | Standardized Value |
|---|---|---|
| enrollment_status ENUM | Enrollment status as of transcript date | GRADUATED (can be imputed), ENROLLED (can be imputed), RE-ENROLLED, LEAVE-OF-ABSENCE, TRANSFERRED-OUT-INTERNAL, TRANSFERRED-OUT-EXTERNAL, PROBATION, TERMINATED, WITHDRAWN |
| graduation_date | Graduation ceremony date | mm/dd/yyyy Populated for graduated students only |
| college | College name | As on Transcript |
| campus | Campus name | As on Transcript |
| degrees | object | See Degree object |
| degree_awarded_date | Degree awarded date | mm/dd/yyyy Populated for graduated students only |
| major | object | See Major object |
| minor | object | See Minor object |

| Attribute | Description | Standardized Value |
|---|---|---|
| honors | Academic honors or awards for current degree E.g.: Cum Laude, Summa Cum Laude, Magna Cum Laude | As on Transcript |
| credit_system | Method of recording hours of study E.g.: Semester Credits, Quarter Credits, Units, Clock Hours | For Post-Secondary Programs: SEMESTER CREDITS (1 course = 3 credits) For High Schools: UNITS (1 course = 1 or 0.5 unit) |
| credits | object | See Credits object |
| institution_cgpa | CGPA for graded courses | Calculated using MeasureOne standardized grade system Scale: 4-point |

| Attribute | Description | Standardized Value |
|---|---|---|
| transfer_cgpa | taken at the institution CGPA for transferred courses | Formula: (Sum of Quality Points)/(Sum of GPA Credits) Definitions null |
| total_cgpa | Total CGPA for current program | See institution_cgpa Note: For total_CGPA, MeasureOne considers only courses taken at the institution on a graded basis |
| last_attended_date | Last attended date at current institution | mm/dd/yyyy Can be imputed based from last term details |
| terms | object | See Term object |

Degree

Each change in degree sought is listed as a separate object

| Attribute | Description | Standardized Value |
|---|---|---|
| degree_level ENUM | Academic level- broad categories | Imputed based on Degree, Degree Type, Program Name or Program Plan UNDERGRADUATE, GRADUATE, HIGH-SCHOOL |
| degree_type ENUM | Academic level- granular categories | Imputed based on Degree, Program Name or Program Plan ASSOCIATE, BACHELORS, MASTERS, MASTERS-RESEARCH, FIRST-PROFESSIONAL, DOCTORAL, CERTIFICATE/DIPLOMA, HIGH-SCHOOL-DIPLOMA, NON-DEGREE |
| degree | Degree type and area of study E.g.: Bachelor of Science, MA in Sociology, BA | As on Transcript |
| program | Degree type, broad area of study and subject specialization E.g.: Bachelor of Science in Microbiology, | As on Transcript |

| Attribute | Description | Standardized Value |
|---|---|---|
| order | MA in Economics Order in which degrees were sought (reverse chronological) | Imputed from program and term information 1 = current/most recent, 2 = previous, etc. |
| awarded BOOLEAN | Whether degree is awarded as of transcript date or no | Imputed value |

Credits

For course-level data, priority is given to reported values when available. If credits earned are not recorded on the transcript, values are imputed based on a combination of credits attempted and grades. For credits attempted, earned and gpa_credits, range: 0-5.

For enrollment-level data, values are calculated using course-level values. For credits attempted, earned and gpa_credits, range: 0-130 (Undergraduate), 0-60 (Graduate), 0-50 (High School).

| Attribute | Description | Standardized Value |
|---|---|---|
| attempted | Credits attempted | Units: For Post-Secondary institutions: SEMESTER |

| Attribute | Description | Standardized Value |
| --- | --- | --- |
| earned | Credits earned | CREDITS or Units: For High Schools: UNITS For Post-Secondary Institutions: SEMESTER CREDITS or |
| gpa_credits | Credits attempted on courses that are included in the GPA calculation | For High Schools: UNITS Units: For Post-Secondary Institutions: SEMESTER CREDITS or For High Schools: UNITS |
| quality_points | Numerator for GPA calculation Formula: Credits Attempted × Grade Points Earned | Range (Course): 0-20 Range (Enrollment, Undergraduate): 0-520 Range (Enrollment, Graduate): 0-240 Range (Enrollment, High School): 0-200 |
| source ENUM | Source of credits | Course object: null Enrollment object: INSTITUTION, TRANSFER, TOTAL |

Major

Each declared major or change in declared major is listed as a separate object

| Attribute | Description | Standardized Value |
| --- | --- | --- |
| major | Subject specialization for current program | As on Transcript |
| concentration | Further specialization within major | As on Transcript |
| department | Department offering the major | As on Transcript |
| order | Order of majors sought (reverse chronological) | Imputed from term dates 1 = current/most recent, 2 = previous, etc. |

Minor

Each declared minor or change in declared minor is listed as a separate object

| Attribute | Description | Standardized Value |
| --- | --- | --- |
| minor | Secondary specialization for current program | As on Transcript |
| order | Order of minors sought (reverse chronological) | Imputed from term dates 1 = current/most recent, 2 = previous, etc. |

Term

Post-Secondary Institutions: Each enrolled term at the institution is a separate object.

High Schools: Each high school semester is one term object.

Transfer Terms: Courses taken at a previous institution and transferred in are listed as a separate term. There can be multiple transfer terms, one for each institution from which credits are transferred in.

Advanced Placement Terms: Advanced Placement or CLEP exams that count towards credit requirements are listed as a separate term.

| Attribute | Description | Standardized Value |
| --- | --- | --- |
| name | Name of term or semester | FALL <YYYY>, WINTER <YYYY>, SPRING <YYYY>, SUMMER <YYYY> Example: FA2018 is converted to FALL 2018, SPR19 is converted to SPRING 2019, etc. Note: This attribute is not standardized for high schools or non-US transcripts. |
| start_date & end_date | Start & end dates of the term or semester | mm/dd/yyyy If transcript has a Winter term: Fall: Oct. 1 to Dec. 31 Winter: Jan. 2 to Mar. 31 Spring: Apr. 1 to Jun. 30 Summer: Jul. 1 to Sep. 30 If transcript has no Winter term: Fall: Aug. 15 to Dec. 15 Spring: Jan. 1 to May 15 Summer: May 16 to Aug. 14 |

| Attribute | Description | Standardized Value |
|---|---|---|
| | | Note: This attribute is not standardized for high schools or non-US transcripts. |
| transfer BOOLEAN | Whether the term represents credits transferred in from an earlier institution | true if credits listed for the term were transferred in |
| transferred_from_school | For transfer terms, institution from which the credits were transferred | As on Transcript |
| advanced_placement BOOLEAN | Whether term represents credits earned via College Board Advanced Placement or CLEP exams | true if courses listed for the term are AP or CLEP exams |
| in_progress BOOLEAN | Whether term is in progress as of transcript date | If not provided, imputed based on grades ("IP" or not yet available) and/or term dates |
| courses | object | See Course object |

Course
Each course listed on the transcript is one object

| Attribute | Description | Standardized Value |
|---|---|---|
| code | Course code | As on Transcript |
| name | Course name | As on Transcript |
| credits | object | See Credits object |
| grading | object | See Grading object |
| retaken STRING | Whether retaken in order to improve grade | true for each instance of a retaken course Note: Credits on retaken courses are earned just once and grades on all attempts are included in the standardized GPA calculation. If earlier grade is not listed on the transcript, it is treated as a D. |

Grading
For transcripts with non-standard grades, MeasureOne 35 maps reported grades to standardized letter grades (see value below) using information from the following sources (listed in order of priority): 1. Transcript 2. School website 3. Country-level grade conversions (for non-US transcripts)

| Attribute | Description | Standardized Value |
|---|---|---|
| pass_fail BOOLEAN | Whether evaluated on pass-fail basis, i.e. non-graded | Imputed based on grades |
| grade_format | Format of the grade, i.e. Numeric or Letter | LETTER |

| Attribute | Description | Standardized Value |
|---|---|---|
| value ENUM | Grade earned | A, B, C, D - Passing grades on a graded course Plus/Minus grades (A+, B−) are standardized to a letter with no sign (A, B) F - Fail on a Graded Course S - Satisfactory on a Pass-Fail Course (credits are earned) U - Unsatisfactory on a Pass-Fail Course P - Pass on a Pass-Fail Course (credits are not earned) NP - Not Passed on a Pass-Fail Course (credits are not earned) Withdrawn Withdrawn-Fail Incomplete Incomplete-Fail Retaken In-Progress |

-continued

| Attribute | Description | Standardized Value |
|---|---|---|
| | | Transfer |
| | | Other GECI - Grade not included in GPA, Credits Earned |
| | | Other GECE - Grade not included in GPA, Credits Not Earned |
| | | Advanced Placement |
| grade_points | Quality points for grade, used in GPA calculation | 4-point scale:<br>A = 4<br>B = 3<br>C = 2<br>D = 1 |

| Attribute | Description | Standardized Value |
|---|---|---|
| | | F = 0 |
| | | W = 0 |
| | | For any given letter, all three possibilities i.e., Plus, Minus and No-sign, have the same value |

What is claimed is:

1. A method comprising:
receiving, at an intermediary host system, a request from a first entity to retrieve source data corresponding to an individual, the request accessing an information service hosted by the intermediary host system, the information service associated with a defined purpose from a plurality of defined purposes, the source data hosted at a remote source data host associated with a second entity;
retrieving the source data by:
establishing, at a proxy, a proxied session between a client device associated with the individual and the remote source data host; and
extracting, by the proxy during the proxied session, the source data from the remote source data host;
processing the source data to generate response data corresponding to the defined purpose;
providing the first entity access to the response data including the processed source data via one or more application programming interfaces; and
transmitting an invitation to the client device associated with the individual, the invitation operative when accepted to initiate the retrieving the source data.

2. The method of claim 1 further comprising
maintaining, at the intermediary host system, source data addressing information for each of a plurality of remote source data hosts;
presenting to the individual at the client device a set of remote source data host identifiers corresponding to the plurality of remote source data hosts;
receiving a selection of a remote source data host identifier; and
using the source data addressing information associated with the selected remote source data host identifier in the retrieving the source data.

3. The method of claim 1 further comprising
during the proxied session, receiving at the proxy authentication credentials from the client device of the individual;
using, by the proxy, the authentication credentials to establish an authenticated connection with the remote source data host.

4. The method of claim 3 further comprising
accessing a script of input/output events, the script corresponding to the remote source data host; and
executing, at the proxy, the script of input/output events to retrieve the source data from the remote source data host.

5. The method of claim 1 further comprising notifying the first entity when the response data is available for access.

6. The method of claim 1 wherein processing the source data comprises analyzing the source data to generate a score, and wherein the processed data comprises the score.

7. The method of claim 1 wherein processing the source data comprises normalizing the source data against one or more rules to generate a set of normalized data, and wherein the processed data comprises the set of normalized data.

8. One or more non-transitory computer-readable media storing instructions for scheduling and establishing communications sessions with a plurality of users, wherein the instructions, when executed by one or more computing devices, cause at least one of the one or more computing devices to:
receive, at an intermediary host system, a request from a first entity to retrieve source data corresponding to an individual, the request accessing an information service hosted by the intermediary host system, the information service associated with a defined purpose from a plurality of defined purposes, the source data hosted at a remote source data host associated with a second entity;
retrieve the source data by:
establishing, at a proxy, a proxied session between a client device associated with the individual and the remote source data host; and
extracting, by the proxy during the proxied session, the source data from the remote source data host;
process the source data to generate response data corresponding to the defined purpose;
provide the first entity access to the response data including the processed source data via one or more application programming interfaces; and
transmit an invitation to the client device associated with the individual, the invitation operative when accepted to initiate the retrieving the source data.

9. The non-transitory computer-readable media of claim 8 further comprising instructions, when executed by one or more computing devices, to cause at least one of the one or more computing devices to:

maintain, at the intermediary host system, source data addressing information for each of a plurality of remote source data hosts;
present to the individual at the client device a set of remote source data host identifiers corresponding to the plurality of remote source data hosts;
receive a selection of a remote source data host identifier; and
use the source data addressing information associated with the selected remote source data host identifier in the retrieving the source data.

10. The non-transitory computer-readable media of claim 8 further comprising instructions, when executed by one or more computing devices, to cause at least one of the one or more computing devices to:
during the proxied session, receive at the proxy authentication credentials from the client device of the individual;
use, by the proxy, the authentication credentials to establish an authenticated connection with the remote source data host.

11. The non-transitory computer-readable media of claim 10 further comprising instructions, when executed by one or more computing devices, to cause at least one of the one or more computing devices to:
access a script of input/output events, the script corresponding to the remote source data host; and
execute, at the proxy, the script of input/output events to retrieve the source data from the remote source data host.

12. The non-transitory computer-readable media of claim 8 further comprising instructions, when executed by one or more computing devices, to cause at least one of the one or more computing devices to:
notify the first entity when the response data is available for access.

13. The non-transitory computer-readable media of claim 8 wherein processing the source data comprises analyzing the source data to generate a score, and wherein the processed data comprises the score.

14. The non-transitory computer-readable media of claim 8 wherein processing the source data comprises normalizing the source data against one or more rules to generate a set of normalized data, and wherein the processed data comprises the set of normalized data.

15. A method comprising
receiving, from a user browser executing on a user device, a request at a proxy to access a target resource server;
responsive to the request, establishing a first connection between a proxy browser instance and the target resource server;
receiving, at the proxy browser instance, resource data from the target resource data;
processing, at the proxy browser instance, the resource data to generate a modeled version of the resource data;
transmitting to the user browser a structured document including the modeled version of the resource data maintained at the proxy browser instance and synchronization code, wherein the synchronization code operative to establish a second connection between the user browser and the proxy, and to capture event data relating to interaction events associated with one to a plurality of input-output devices associated with the user device and transmit the event data over the second connection to the proxy;
receiving, at the proxy, event data captured by the synchronization code;
processing, by the proxy browser instance, the event data to replicate the interaction events at the proxy browser instance;
monitoring, at the proxy browser instance, for changes to the modeled version of the resource data; and
responsive to changes to the modeled version of the resource data, sending updates to the synchronization code over the second connection, wherein the synchronization code is operative to update the rendered resource data processed by the user browser.

16. The method of claim 15 wherein the resource data comprises structured document code for rendering by a browser and one or more executable code objects operative to generate or modify the structured document code when executed by a browser.

17. The method of claim 16 wherein processing the resource data comprises executing code or scripts embedded in the resource data; and removing executable code from the rendered version of the resource data transmitted to the user browser.

* * * * *